United States Patent
Yao et al.

(10) Patent No.: US 12,309,765 B2
(45) Date of Patent: *May 20, 2025

(54) METHOD AND DEVICE FOR TRANSMITTING OR RECEIVING SCHEDULING INFORMATION

(71) Applicant: XI'AN ZHONGXING NEW SOFTWARE CO., LTD., Shaanxi (CN)

(72) Inventors: Ke Yao, Guangdong (CN); Kaiying Lv, Guangdong (CN); Weimin Xing, Guangdong (CN); Bo Sun, Guangdong (CN); Kaibo Tian, Guangdong (CN)

(73) Assignee: Xi'an Zhongxing New Software Co., Ltd., Shaanxi (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,391

(22) Filed: Dec. 20, 2021

(65) Prior Publication Data

US 2022/0256555 A1     Aug. 11, 2022

Related U.S. Application Data

(63) Continuation of application No. 16/854,001, filed on Apr. 21, 2020, now Pat. No. 11,206,676, which is a (Continued)

(30) Foreign Application Priority Data

Mar. 31, 2015   (CN) .......................... 201510147334.6

(51) Int. Cl.
*H04W 72/12* (2023.01)
*H04W 28/20* (2009.01)
(Continued)

(52) U.S. Cl.
CPC ........... *H04W 72/12* (2013.01); *H04W 28/20* (2013.01); *H04W 72/23* (2023.01); *H04W 88/02* (2013.01)

(58) Field of Classification Search
CPC ..... H04W 72/12; H04W 88/02; H04W 28/20; H04W 72/1289
See application file for complete search history.

(56) References Cited

U.S. PATENT DOCUMENTS

| | | |
|---|---|---|
| 6,031,845 A | 2/2000 | Walding |
| 7,363,039 B2 | 4/2008 | Laroia et al. |

(Continued)

FOREIGN PATENT DOCUMENTS

| | | | |
|---|---|---|---|
| CN | 101820645 A | * | 9/2010 |
| CN | 102158976 A | | 8/2011 |

(Continued)

OTHER PUBLICATIONS

62130127, Specification, Mar. 9, 2015 (Year: 2015).
(Continued)

*Primary Examiner* — Parth Patel
(74) *Attorney, Agent, or Firm* — Perkins Coie LLP

(57) ABSTRACT

A method and a device for transmitting or receiving scheduling information are described. In the method for transmitting scheduling information, information about a scheduling result of resources to be occupied by one or more User Equipment (UEs) is acquired; and scheduling information including a first type of scheduling information and a second type of scheduling information is transmitted to the one or more UEs according to the information about the scheduling result. The first type of scheduling information includes information for parsing the second type of scheduling information, and the scheduling information determines a resource scheduling condition of the user.

20 Claims, 6 Drawing Sheets

Frame structure 9

Related U.S. Application Data continuation of application No. 15/563,885, filed as application No. PCT/CN2015/087838 on Aug. 21, 2015, now Pat. No. 10,631,310.

(51) Int. Cl.
*H04W 72/23* (2023.01)
*H04W 88/02* (2009.01)

(56) References Cited

U.S. PATENT DOCUMENTS

| | | | |
|---|---|---|---|
| 7,756,092 B1 * | 7/2010 | Ho | H04W 28/24 370/338 |
| 8,036,663 B2 | 10/2011 | Jin et al. | |
| 8,351,367 B2 | 1/2013 | Yellin et al. | |
| 8,537,876 B2 | 9/2013 | Hooli et al. | |
| 8,576,784 B2 | 11/2013 | Lohr et al. | |
| 8,711,797 B2 | 4/2014 | Kim et al. | |
| 8,750,156 B1 | 6/2014 | Carbajal | |
| 8,798,548 B1 | 8/2014 | Carbajal | |
| 8,848,632 B2 | 9/2014 | Ogawa et al. | |
| 9,137,793 B2 | 9/2015 | Jung et al. | |
| 9,143,300 B2 | 9/2015 | Yu et al. | |
| 9,295,063 B2 | 3/2016 | Ji et al. | |
| 9,565,655 B2 * | 2/2017 | Love | H04L 1/0046 |
| 9,596,690 B2 | 3/2017 | Webb et al. | |
| 9,794,929 B2 | 10/2017 | Cheong et al. | |
| 9,839,025 B2 | 12/2017 | Sampath et al. | |
| 9,882,683 B2 | 1/2018 | Torsner et al. | |
| 9,883,490 B1 | 1/2018 | Hedayat | |
| 9,974,058 B2 | 5/2018 | Maattanen et al. | |
| 9,974,069 B2 | 5/2018 | Darwood et al. | |
| 9,986,568 B2 | 5/2018 | Webb et al. | |
| 10,034,278 B2 | 7/2018 | Larsson et al. | |
| 10,057,794 B2 | 8/2018 | Wakabayashi et al. | |
| 10,057,899 B2 * | 8/2018 | Lee | H04L 1/0083 |
| 10,070,419 B2 | 9/2018 | Huang et al. | |
| 10,117,250 B2 | 10/2018 | Inoue et al. | |
| 10,145,707 B2 | 12/2018 | Chowdhary et al. | |
| 10,149,296 B1 | 12/2018 | Noh et al. | |
| 10,177,891 B2 | 1/2019 | Sayenko et al. | |
| 10,187,885 B2 | 1/2019 | Kim et al. | |
| 10,200,872 B2 | 2/2019 | Sakhnini et al. | |
| 10,244,535 B2 | 3/2019 | Kim et al. | |
| 10,411,870 B2 | 9/2019 | Son et al. | |
| 10,631,310 B2 * | 4/2020 | Yao | H04W 72/12 |
| 11,206,676 B2 * | 12/2021 | Yao | H04W 28/20 |
| 2001/0004599 A1 * | 6/2001 | Dokko | H04W 72/20 455/452.2 |
| 2004/0235485 A1 | 11/2004 | Tanaka | |
| 2006/0203856 A1 * | 9/2006 | Laroia | H04L 1/0026 370/522 |
| 2006/0215628 A1 | 9/2006 | Olariu et al. | |
| 2006/0223572 A1 | 10/2006 | Hedin et al. | |
| 2008/0045227 A1 | 2/2008 | Nagai | |
| 2008/0076439 A1 | 3/2008 | Cho et al. | |
| 2008/0165734 A1 | 7/2008 | Hart et al. | |
| 2009/0029710 A1 | 1/2009 | Ochiai et al. | |
| 2009/0191910 A1 | 7/2009 | Athalye et al. | |
| 2009/0196180 A1 * | 8/2009 | Bahl | H04L 5/0032 370/252 |
| 2010/0074164 A1 | 3/2010 | Hart et al. | |
| 2010/0074209 A1 | 3/2010 | Montojo et al. | |
| 2010/0195586 A1 | 8/2010 | Choi et al. | |
| 2010/0208687 A1 | 8/2010 | Lim et al. | |
| 2010/0309857 A1 | 12/2010 | Kawamura et al. | |
| 2011/0038345 A1 | 2/2011 | Liu et al. | |
| 2011/0105171 A1 | 5/2011 | Luschi et al. | |
| 2011/0158152 A1 | 6/2011 | Lu et al. | |
| 2011/0205995 A1 | 8/2011 | Grovlen | |
| 2011/0211589 A1 | 9/2011 | Fang et al. | |
| 2011/0255425 A1 * | 10/2011 | Pikkarainen | H04W 48/08 370/252 |
| 2011/0319112 A1 | 12/2011 | Jeong et al. | |
| 2012/0039408 A1 | 2/2012 | Hamaguchi | |
| 2012/0057548 A1 | 3/2012 | Hasegawa | |
| 2012/0063369 A1 | 3/2012 | Lin et al. | |
| 2012/0087323 A1 | 4/2012 | Feng et al. | |
| 2012/0207115 A1 | 8/2012 | Oh | |
| 2012/0275428 A1 * | 11/2012 | Feng | H04L 5/0092 370/330 |
| 2012/0289273 A1 * | 11/2012 | Wang | H04W 72/23 455/509 |
| 2012/0307769 A1 | 12/2012 | Fujita | |
| 2012/0322455 A1 | 12/2012 | Oh | |
| 2013/0039329 A1 | 2/2013 | Matsumoto et al. | |
| 2013/0100923 A1 | 4/2013 | Fei et al. | |
| 2013/0182680 A1 | 7/2013 | Choi et al. | |
| 2014/0010101 A1 | 1/2014 | Jin et al. | |
| 2014/0128000 A1 | 5/2014 | Lim et al. | |
| 2014/0185533 A1 | 7/2014 | Haub | |
| 2014/0198745 A1 | 7/2014 | Fei | |
| 2014/0269552 A1 | 9/2014 | Saito | |
| 2014/0286275 A1 * | 9/2014 | Park | H04L 5/0053 370/329 |
| 2014/0293908 A1 | 10/2014 | Kumar et al. | |
| 2014/0301268 A1 * | 10/2014 | Xu | H04J 11/005 370/312 |
| 2014/0313952 A1 | 10/2014 | Ghosh | |
| 2014/0369292 A1 | 12/2014 | Wu et al. | |
| 2015/0029961 A1 | 1/2015 | Chae et al. | |
| 2015/0029996 A1 | 1/2015 | Yuan | |
| 2015/0103777 A1 * | 4/2015 | Chen | H04L 5/0091 370/329 |
| 2015/0163028 A1 | 6/2015 | Tandra et al. | |
| 2015/0181603 A1 | 6/2015 | Wakabayahi | |
| 2015/0188650 A1 | 7/2015 | Au et al. | |
| 2015/0201402 A1 | 7/2015 | Morioka | |
| 2015/0230233 A1 | 8/2015 | Kobayashi et al. | |
| 2015/0237632 A1 | 8/2015 | Soldati | |
| 2015/0264683 A1 | 9/2015 | Kim et al. | |
| 2015/0264708 A1 | 9/2015 | Li et al. | |
| 2015/0296514 A1 | 10/2015 | Morioka et al. | |
| 2015/0365209 A1 * | 12/2015 | Yi | H04W 72/20 370/329 |
| 2015/0365945 A1 | 12/2015 | Morioka et al. | |
| 2015/0373721 A1 | 12/2015 | Zhang et al. | |
| 2016/0007325 A1 | 1/2016 | Seok | |
| 2016/0007334 A1 | 1/2016 | Kim et al. | |
| 2016/0044676 A1 | 2/2016 | Choi et al. | |
| 2016/0044705 A1 | 2/2016 | Gao et al. | |
| 2016/0066338 A1 | 3/2016 | Kwon et al. | |
| 2016/0073336 A1 * | 3/2016 | Geller | H04W 48/20 455/434 |
| 2016/0088627 A1 | 3/2016 | Tayrac et al. | |
| 2016/0100381 A1 | 4/2016 | Li et al. | |
| 2016/0113009 A1 | 4/2016 | Seok | |
| 2016/0127096 A1 | 5/2016 | Lee et al. | |
| 2016/0143005 A1 | 5/2016 | Ghosh et al. | |
| 2016/0143030 A1 | 5/2016 | Lee et al. | |
| 2016/0218786 A1 | 7/2016 | Mizusawa | |
| 2016/0242200 A1 | 8/2016 | Yan et al. | |
| 2016/0254839 A1 | 9/2016 | Dahlman et al. | |
| 2016/0295587 A1 | 10/2016 | Kwon | |
| 2016/0302217 A1 | 10/2016 | Yang et al. | |
| 2016/0309367 A1 | 10/2016 | Li et al. | |
| 2016/0316376 A1 | 10/2016 | Wen et al. | |
| 2016/0338040 A1 | 11/2016 | Lee et al. | |
| 2016/0345307 A1 | 11/2016 | Huang et al. | |
| 2017/0019916 A1 | 1/2017 | Azizi et al. | |
| 2017/0078898 A1 | 3/2017 | Huang et al. | |
| 2017/0105229 A1 | 4/2017 | Luo et al. | |
| 2017/0111914 A1 | 4/2017 | Chen et al. | |
| 2017/0150506 A1 | 5/2017 | Mitsui et al. | |
| 2017/0201357 A1 * | 7/2017 | Choi | H04L 27/2613 |
| 2017/0214561 A1 | 7/2017 | Lee et al. | |
| 2017/0230914 A1 | 8/2017 | Papasakellariou et al. | |
| 2017/0264475 A1 | 9/2017 | Son et al. | |
| 2017/0265184 A1 | 9/2017 | Liu et al. | |
| 2017/0272138 A1 | 9/2017 | Chun et al. | |
| 2017/0289962 A1 | 10/2017 | Kim et al. | |
| 2017/0325048 A1 | 11/2017 | Jamadagni et al. | |
| 2017/0373812 A1 | 12/2017 | Berggren et al. | |
| 2017/0373816 A1 | 12/2017 | Son et al. | |

(56) References Cited

U.S. PATENT DOCUMENTS

| | | |
|---|---|---|
| 2018/0007661 A1 | 1/2018 | Chun et al. |
| 2018/0049240 A1* | 2/2018 | Kim .................. H04W 74/08 |
| 2018/0124793 A1 | 5/2018 | Iwai et al. |
| 2018/0124804 A1* | 5/2018 | Yao .................. H04W 28/20 |
| 2018/0139737 A1 | 5/2018 | Beale |
| 2018/0376507 A1 | 12/2018 | Kwon et al. |
| 2019/0036642 A1 | 1/2019 | Huang et al. |
| 2019/0222393 A1 | 7/2019 | Lin et al. |
| 2019/0281626 A1 | 9/2019 | Lin et al. |

FOREIGN PATENT DOCUMENTS

| | | |
|---|---|---|
| CN | 102958184 A | 3/2013 |
| CN | 103391148 A | 11/2013 |
| CN | 104010375 A | 8/2014 |
| EP | 2690919 A1 | 1/2014 |
| EP | 2844003 A1 | 3/2015 |
| EP | 2846503 A1 | 3/2015 |
| EP | 2914043 A2 | 9/2015 |
| WO | 2013139207 A1 | 9/2013 |
| WO | 2013167090 A2 | 11/2013 |
| WO | 2014036839 A1 | 3/2014 |

OTHER PUBLICATIONS

62130200, Specification, Mar. 9, 2015 (Year: 2015).
Extended EP Search Report issued Mar. 13, 2018 re: Application No. 15887170.7, pp. 1-7.
International Search Report issued Nov. 24, 2015 re: Application No. PCT/CN2015/087838; pp. 1-2.

* cited by examiner

Basic frame structure 1

Basic frame structure 2

Basic frame structure 3

Basic frame structure 4

Frame structure 5

Frame structure 6

| Traditional frame header | HE-SIG-A | HE-STF | HE-LTF1 | HE-SIG-B (User 3) | User 3 data |
|---|---|---|---|---|---|
| | | | | HE-SIG-B (User 2) | User 2 data |
| Unavailable bandwidth | | | | | |
| Traditional frame header | HE-SIG-A | HE-STF | HE-LTF1 | HE-SIG-B (User 1) | HE-LTF (2~N) | User 1 data |

Frame structure 7

Fig. 14

| Traditional frame header | HE-SIG-A | HE-STF | HE-LTF1 | HE-SIG-B (User 3) | User 3 data |
|---|---|---|---|---|---|
| | | | | HE-SIG-B (User 2) | User 2 data |
| Unavailable bandwidth | | | | | |
| Traditional frame header | HE-SIG-A | HE-STF | HE-LTF1 | HE-SIG-B (User 1) | HE-SIG-B (User 1) | HE-LTF (2~N) | User 1 data |

Frame structure 8

Fig. 15

| Traditional frame header | HE-SIG-A | HE-STF | HE-LTF1 | HE-SIG-B (User 2) | HE-SIG-B (User 3) | User 3 data |
|---|---|---|---|---|---|---|
| | | | | | | User 2 data |
| Unavailable bandwidth | | | | | | |
| Traditional frame header | HE-SIG-A | HE-STF | HE-LTF1 | HE-SIG-B (User 1) | HE-SIG-B (User 1) | HE-LTF (2~N) | User 1 data |

Frame structure 9

Fig. 16

| Traditional frame header | HE-SIG-A | HE-STF | HE-LTF1 | HE-SIG-B (User 3) | HE-SIG-B (User 4) | HE-SIG-B (User 5) | HE-SIG-B (User 6) | User 5 data and User 6 data |
|---|---|---|---|---|---|---|---|---|
| | | | | | | | | User 3 data and User 4 data |
| Traditional frame header | HE-SIG-A | HE-STF | HE-LTF1 | HE-SIG-B (User 2) | HE-SIG-B (User 2) | | | User 2 data |
| Traditional frame header | HE-SIG-A | HE-STF | HE-LTF1 | HE-SIG-B (User 1) | | | HE-LTF (2~N) | User 1 data |

Frame structure 10

Fig. 17

METHOD AND DEVICE FOR TRANSMITTING OR RECEIVING SCHEDULING INFORMATION

CROSS REFERENCE TO RELATED APPLICATIONS

This application is a continuation of U.S. patent application Ser. No. 16/854,001, filed on Apr. 21, 2020, which is a continuation of U.S. patent application Ser. No. 15/563,885, filed on Oct. 2, 2017, now U.S. Pat. No. 10,631,310, issued on Apr. 21, 2020, under 35 U.S.C. 371 as the U.S. national stage of International Patent Application Number PCT/CN2015/087838, filed on Aug. 21, 2015, claiming priority to Chinese Patent Application Number 201510147334.6, filed on Mar. 31, 2015, all of which said applications are incorporated herein by reference in their entirety.

TECHNICAL FIELD

The present disclosure relates to the field of communications, and in particular to a method and a device for transmitting or receiving scheduling information.

BACKGROUND

At present, as more and more people use Wireless Local Access Network (WLAN) to carry out data communication, WLAN network load increases constantly. The industrial specification group of Institute of Electrical and Electronic Engineers (IEEE802.11) successively defines a series of standards such as IEEE 802.11a/b/g/n/ac to meet the ever-increasing communication requirements. These standards are committed to improving the technology of 802.11 so as to increase the maximum physical layer transmission rate or maximum network throughput. However, as the number of users grows, the efficiency of the WLAN network has a trend to decrease dramatically, and purely increasing rate cannot solve a problem. Therefore, the working group sets up a relevant High Efficiency WLAN (HEW) group to work on solving the WLAN network efficiency problem.

In traditional WLAN systems, scheduling information may be indicated in a Signal (SIG) Field of a physical frame header. FIG. 1 shows physical frame formats of non-High Throughput (Non-HT) of IEEE802.11a and HT-mixed of IEEE802.11n. Herein, Legacy SIG (L-SIG) may bear the resource scheduling information of non-HT, mainly including a transmission rate and a transmission length. In the HT-mixed format, the scheduling information is expanded. Specifically, besides the L-SIG field, the HT-SIG also stores the scheduling information. Besides the transmission rate and the transmission length, indicator information related to Multiple Input Multiple Output (MIMO) is added, for example, whether it is sounding frame, number of layers, etc. In addition, indicators of new features of 802.11n are also added, for example, aggregation, Space Time Block Code (STBC), etc. FIG. 2 is a physical frame structure of IEEE 802.11ac. Since the downlink Multi-User Multiple Input Multiple Output (MU-MIMO) technology is supported, the scheduling information may be expanded. Therefore, the frame format Very High Throughput SIG (VHT-SIG) of 802.11ac may be divided into two parts: VHT-SIG-A and VHT-SIG-B which respectively bear different information. In 802.11ac, single-user and multi-user may adopt the same resource indicator overhead, and some bit positions may respectively have different syntaxes in the case of single-user and multi-user.

The L-SIG, HT-SIG and VHT-SIG-A may be repeatedly transmitted with 20 MHz as a unit. The VHT-SIG-B is not repeatedly transmitted with 20 MHz as a unit; however, depending on different bandwidths supported, the content that can be carried by 20 MHz first may be bit-level repeated and then may be subjected to subsequent code modulation mapping processing during transmission.

Traditional WLAN may only support full-bandwidth scheduling users. However, in actual application, there may be a high proportion of small data packets, and the transmission of small data packets using a large bandwidth may need a great overhead. In addition, the frequency selective fading of large bandwidth may have a much higher probability than small bandwidth. Considering the above factors, a next generation of WLAN technology introduces an Orthogonal Frequency Division Multiple Access (OFDMA) manner to realize the requirements of transmitting small data packets using a small bandwidth and selecting partial bandwidth according to a frequency selective result.

In the OFDMA technology, frequency resources of one same time period may be allocated to multiple users, and scheduling information may be needed to indicate the resource of each user. Taking a resource allocation granularity of 5 MHz for example, 160 MHz may support at most 32 users. If the scheduling information (also called scheduling indicator information) of all the users is transmitted on the main channel and repeated on other secondary channels according to a traditional manner, the transmission may last for a long time and great resource waste may be caused.

At present, scheduling information may be divided into two types: public scheduling information (which is called navigation information or HE-SIG-A in the solution) and scheduled user specific information (which is called user specific information, or HE-SIG-B). The public information may be repeatedly transmitted on an available frequency band currently scheduled, with a 20 MHz frequency band as a unit, similar to traditional WLAN technologies. However, there is no complete efficient solution for the method on how the public information (e.g., public scheduling information) indicates a receiving end to parse the user specific information so far.

In view of a problem of how the public information indicates a receiving end to parse the user specific information, no effective solution has been proposed so far.

SUMMARY

Some exemplary embodiments of the present disclosure provide a method and a device for transmitting or receiving scheduling information, which may at least solve a problem of how the public information indicates a receiving end to parse the user specific information.

According to one exemplary embodiment of the present disclosure, a method for transmitting scheduling information is provided, which may include the following acts. Information about a scheduling result of resources to be occupied by one or more User Equipment (UEs) may be acquired. Scheduling information including a first type of scheduling information and a second type of scheduling information may be transmitted to the one or more UEs according to the information about the scheduling result. In this exemplary embodiment, the first type of scheduling information may include information for parsing the second type of scheduling information, and the scheduling information may determine a resource scheduling condition of the one or more UEs.

In an exemplary embodiment, the first type of scheduling information may include first frequency domain resource indicator information of a user specific scheduling information area. In this exemplary embodiment, the user specific scheduling information area may refer to an entire bandwidth area occupied by user specific scheduling information of all of one or more UEs that are currently scheduled, and the first frequency domain resource indicator information may be used to indicate whether a specified bandwidth position on a total bandwidth is scheduled.

In an exemplary embodiment, the first frequency domain resource indicator information may indicate, through a bitmap having a fixed number of bits, whether the specified bandwidth position on the total bandwidth is scheduled.

In an exemplary embodiment, the first frequency domain resource indicator information may be further used to indicate a bandwidth applied to the user specific scheduling information area and occupied by data corresponding to the scheduling information.

In an exemplary embodiment, the first type of scheduling information may further include second frequency domain resource indicator information of each piece of the second type of scheduling information. The second frequency domain resource indicator information may be used to indicate that all the second type of scheduling information occupies a same bandwidth value or occupies different bandwidth values.

In an exemplary embodiment, the first type of scheduling information may further include at least one of the following information: first time domain resource indicator information of the user specific scheduling information area, second time domain resource indicator information of each piece of the second type of scheduling information. The first time domain resource indicator information may be used to indicate a first start time and/or a first time domain duration of the user specific scheduling information area, and the second time domain resource indicator information may be used to indicate a second start time and/or a second time domain duration of each piece of the second type of scheduling information.

In an exemplary embodiment, the first start time or the second start time may be configured in one of the following manners. When the first start time or the second start time is used to indicate that adoption of a predefined time is supported, it may not be needed to configure the first start time or the second start time. When the first start time or the second start time is used to indicate that sharing of one start time among different frequency bands is supported, the first start time or the second start time may be configured uniformly. When the first start time or the second start time is used to indicate that adoption of different start times for different frequency bands is supported, the first start time or the second start time may be configured separately.

In an exemplary embodiment, the first time domain duration or the second time domain duration may be configured in one of the following manners. When the first time domain duration or the second time domain duration supports adoption of a predefined time length for the user specific scheduling information area and/or each piece of the second type of scheduling information, it may not be needed to configure the first time domain duration or the second time domain duration. In a condition that the second time domain duration supports a fixed content length for the user specific scheduling information, and a frequency domain width of the second type of scheduling information is known, a time domain duration of each piece of the second type of scheduling information may be calculated and it may not be needed to configure the second time domain duration. In a condition that a content length of the second type of scheduling information is known and a frequency domain width of the second type of scheduling information is known, a time domain duration of each piece of the second type of scheduling information may be calculated and it may not be needed to configure the second time domain duration.

In an exemplary embodiment, the first type of scheduling information may further include a group number, and the group number may be used to indicate a group to which the one or more UEs that are currently scheduled belong.

In an exemplary embodiment, grouping of the one or more UEs may be implemented in at least one of the following manners. A remainder after dividing an Association Identifier (AID) of each UE by the number of groups may be determined, and one or more UEs with the same remainders may be put into the same group. One or more UEs whose predefined UE IDs begin with the same digits, the number of the digits being a predetermined number, may be put into the same group.

In an exemplary embodiment, the second type of scheduling information may include at least one of the following information: user identifier information and resource position indicator information of user data. In this exemplary embodiment, the user identifier information may include AID and/or user Partial Association Identifier (PAID), and the resource position indicator information of the user data may include frequency domain indicator information and/or time domain indicator information.

In an exemplary embodiment, the second type of scheduling information may include at least one of the following information: user data modulation code rate, data packet length, the number of spatial streams, and indicator information used to indicate whether STBC is activated.

In an exemplary embodiment, the first type of scheduling information may be public scheduling information, and the second type of scheduling information may be user specific scheduling information.

According to another exemplary embodiment of the present disclosure, a method for receiving scheduling information is provided, which may include the following acts. A UE may receive scheduling information including a first type of scheduling information and a second type of scheduling information, where the first type of scheduling information may include information for parsing the second type of scheduling information. The UE may acquire a resource scheduling condition of the UE according to the scheduling information.

In an exemplary embodiment, the first type of scheduling information may include first frequency domain resource indicator information of a user specific scheduling information area. In this exemplary embodiment, the user specific scheduling information area may refer to an entire bandwidth area occupied by user specific scheduling information of all of one or more UEs that are currently scheduled, and the first frequency domain resource indicator information may be used to indicate whether a specified bandwidth position on a total bandwidth is scheduled.

In an exemplary embodiment, the first type of scheduling information may be public scheduling information, and the second type of scheduling information may be user specific scheduling information.

According to one exemplary embodiment of the present disclosure, a device for transmitting scheduling information is provided, which may include an acquisition module and a transmitting module. The acquisition module may be configured to acquire information about a scheduling result of resources to be occupied by one or more UEs. The transmitting module may be configured to transmit, according to the information about the scheduling result, scheduling information including a first type of scheduling information and a second type of scheduling information to the one or more UEs. In this exemplary embodiment, the first type of scheduling information may include information for parsing the second type of scheduling information, and the scheduling information may determine a resource scheduling condition of the one or more UEs.

In an exemplary embodiment, the first type of scheduling information may include first frequency domain resource indicator information of a user specific scheduling information area. In this exemplary embodiment, the user specific scheduling information area may refer to an entire bandwidth area occupied by user specific scheduling information of all of one or more UEs that are currently scheduled, and the first frequency domain resource indicator information may be used to indicate whether a specified bandwidth position on a total bandwidth is scheduled.

In an exemplary embodiment, the first frequency domain resource indicator information may indicate, through a bitmap having a fixed number of bits, whether the specified bandwidth position on the total bandwidth is scheduled.

In an exemplary embodiment, the first frequency domain resource indicator information may be further used to indicate a bandwidth applied to the user specific scheduling information area and occupied by data corresponding to the scheduling information.

In an exemplary embodiment, the first type of scheduling information may further include second frequency domain resource indicator information of each piece of the second type of scheduling information. The second frequency domain resource indicator information may be used to indicate that all the second type of scheduling information occupies a same bandwidth value or occupies different bandwidth values.

In an exemplary embodiment, the first type of scheduling information may further include at least one of the following information: first time domain resource indicator information of the user specific scheduling information area, second time domain resource indicator information of each piece of the second type of scheduling information. The first time domain resource indicator information may be used to indicate a first start time and/or a first time domain duration of the user specific scheduling information area, and the second time domain resource indicator information may be used to indicate a second start time and/or a second time domain duration of each piece of the second type of scheduling information.

In an exemplary embodiment, the first start time or the second start time may be configured in one of the following manners. When the first start time or the second start time is used to indicate that adoption of a predefined time is supported, it may not be needed to configure the first start time or the second start time. When the first start time or the second start time is used to indicate that sharing of one start time among different frequency bands is supported, the first start time or the second start time may be configured uniformly. When the first start time or the second start time is used to indicate that adoption of different start times for different frequency bands is supported, the first start time or the second start time may be configured separately.

In an exemplary embodiment, the first time domain duration or the second time domain duration may be configured in one of the following manners. When the first time domain duration or the second time domain duration supports adoption of a predefined time length for the user specific scheduling information area and/or each piece of the second type of scheduling information, it may not be needed to configure the first time domain duration or the second time domain duration. In a condition that the second time domain duration supports a fixed content length for the user specific scheduling information, and a frequency domain width of the second type of scheduling information is known, a time domain duration of each piece of the second type of scheduling information may be calculated and it may not be needed to configure the second time domain duration. In a condition that a content length of the second type of scheduling information is known and a frequency domain width of the second type of scheduling information is known, a time domain duration of each piece of the second type of scheduling information may be calculated and it may not be needed to configure the second time domain duration.

In an exemplary embodiment, the first type of scheduling information may further include a group number, and the group number may be used to indicate a group to which the one or more UEs that are currently scheduled belong.

In an exemplary embodiment, grouping of the one or more UEs may be implemented in at least one of the following manners. A remainder after dividing an Association Identifier (AID) of each UE by the number of groups may be determined, and one or more UEs with the same remainders may be put into the same group. One or more UEs whose predefined UE IDs begin with the same digits, the number of the digits being a predetermined number, may be put into the same group.

In an exemplary embodiment, the second type of scheduling information may include at least one of the following information: user identifier information and resource position indicator information of user data. In this exemplary embodiment, the user identifier information may include AID and/or user PAID, and the resource position indicator information of the user data may include frequency domain indicator information and/or time domain indicator information.

In an exemplary embodiment, the second type of scheduling information may include at least one of the following information: user data modulation code rate, data packet length, the number of spatial streams, and indicator information used to indicate whether STBC is activated.

In an exemplary embodiment, the first type of scheduling information may be public scheduling information, and the second type of scheduling information may be user specific scheduling information.

According to another exemplary embodiment of the present disclosure, a device for receiving scheduling information is provided, which may include: a receiving module and an acquisition module. The receiving module may be configured to receive scheduling information including a first type of scheduling information and a second type of scheduling information, where the first type of scheduling information may include information for parsing the second type of scheduling information. The acquisition module may be configured to acquire a resource scheduling condition of the UE according to the scheduling information.

In an exemplary embodiment, the first type of scheduling information may include first frequency domain resource indicator information of a user specific scheduling information area. In this exemplary embodiment, the user specific scheduling information area may refer to an entire bandwidth area occupied by user specific scheduling information of all of one or more UEs that are currently scheduled, and the first frequency domain resource indicator information may be used to indicate whether a specified bandwidth position on a total bandwidth is scheduled.

In an exemplary embodiment, the first type of scheduling information may be public scheduling information, and the second type of scheduling information may be user specific scheduling information.

Through the solution of some embodiments of present disclosure, information about a scheduling result of resources to be occupied by one or more UEs may be acquired, and scheduling information including a first type of scheduling information and a second type of scheduling information may be transmitted to the one or more UEs according to the information about the scheduling result. The first type of scheduling information may include information for parsing the second type of scheduling information, and the scheduling information may determine a resource scheduling condition of the user. The solution in some embodiments of the present disclosure may solve a problem of how public information indicates a receiving end to decode user specific information, and may realize an effect that the public information indicates the receiving end to parse the user specific information.

BRIEF DESCRIPTION OF THE DRAWINGS

FIG. 14 is a diagram illustrating a seventh basic frame structure according to an exemplary embodiment of the present disclosure.

FIG. 15 is a diagram illustrating an eighth basic frame structure according to an exemplary embodiment of the present disclosure.

FIG. 16 is a diagram illustrating a ninth basic frame structure according to an exemplary embodiment of the present disclosure.

FIG. 17 is a diagram illustrating a tenth basic frame structure according to an exemplary embodiment of the present disclosure.

DETAILED DESCRIPTION OF THE EMBODIMENTS

Figure 1:
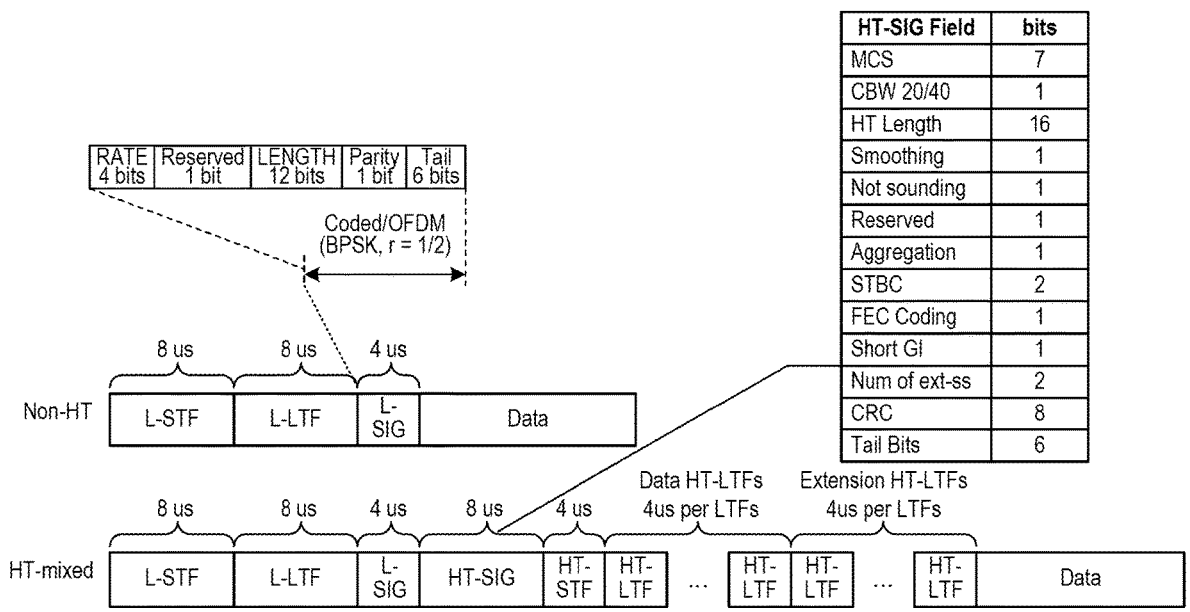
FIG. 1 is a diagram illustrating physical frame formats of non-HT of 802.11a and HT-mixed of 802.11n.
Figure 2:
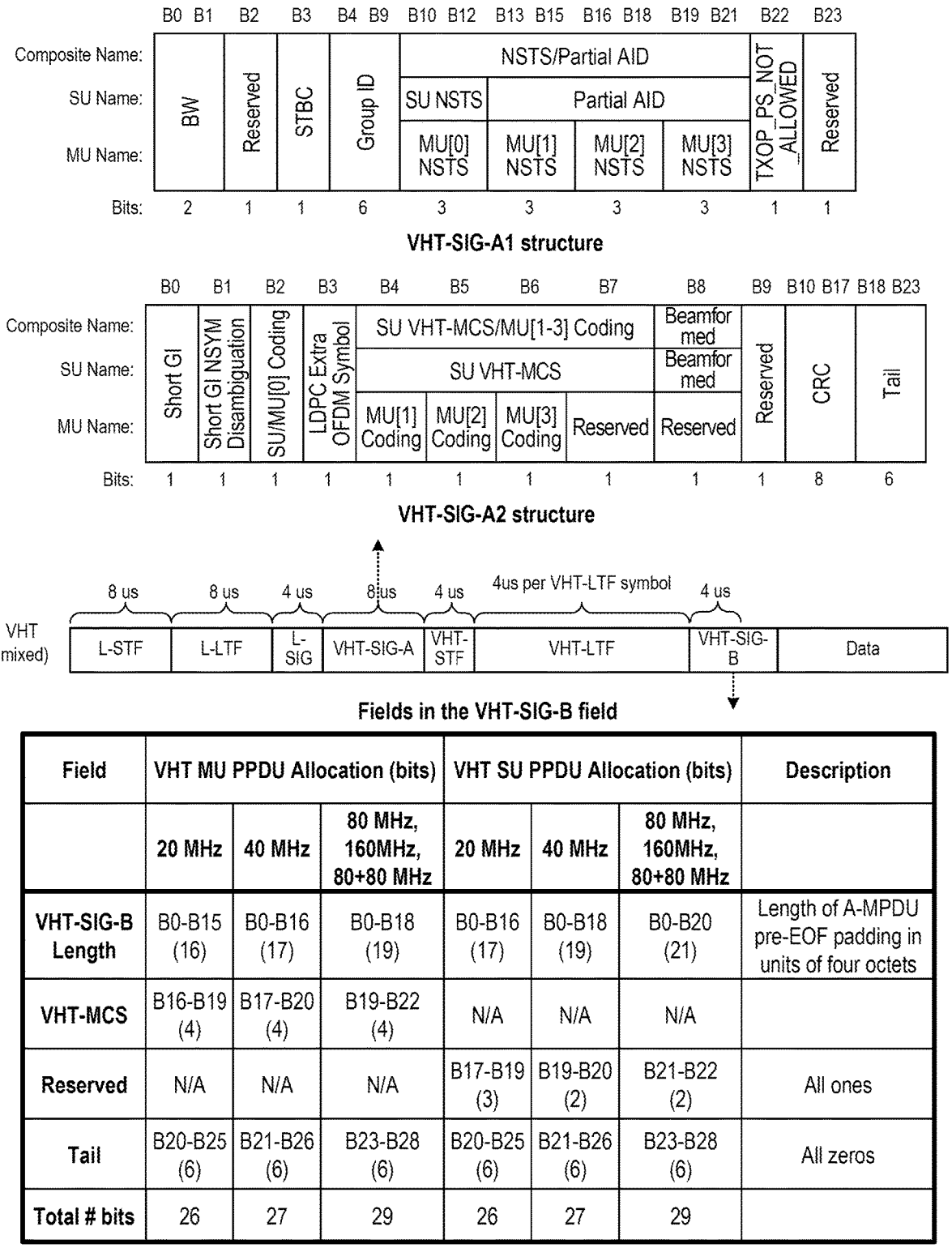
FIG. 2 is a diagram illustrating a physical frame structure of 802.11ac.
Figure 3:
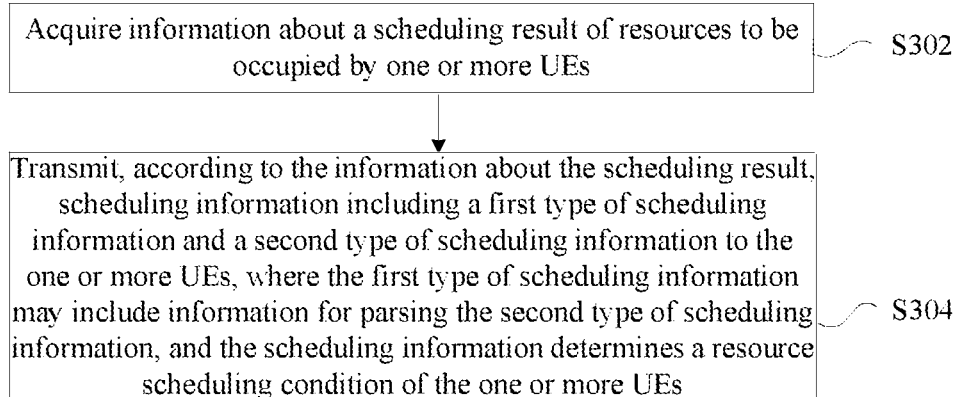
FIG. 3 is a flowchart illustrating a method for transmitting scheduling information according to an exemplary embodiment of the present disclosure.

A method for transmitting scheduling information is provided in an exemplary embodiment. FIG. 3 is a flowchart illustrating a method for transmitting scheduling information according to the exemplary embodiment of the present disclosure. As shown in FIG. 3, the flow may include the following acts S302 and S304.

At act S302, information about a scheduling result of resources to be occupied by one or more UEs may be acquired.

At act S304, scheduling information including a first type of scheduling information and a second type of scheduling information may be transmitted to the one or more UEs according to the information about the scheduling result. The first type of scheduling information may include information for parsing the second type of scheduling information, and the scheduling information may determine a resource scheduling condition of the one or more UEs.

Through the above acts, the information about the scheduling result may be transmitted according to the one or more UEs, the first type of scheduling information and the second type of scheduling information may be transmitted to the one or more UEs. The first type of scheduling information may include information for parsing the second type of scheduling information of the one or more UEs, so that the UE may parse the user specific information according to the above scheduling information. By virtue of this solution, a problem of how public information indicates a receiving end to parse the user specific information may be solved, and an effect that the public information indicates the receiving end to parse the user specific information may be realized.

The first type of scheduling information may include many forms of information, and some examples are given below. In an exemplary embodiment, the first type of scheduling information may include first frequency domain resource indicator information of a user specific scheduling information area. In this exemplary embodiment, the user specific scheduling information area may refer to an entire bandwidth area occupied by user specific scheduling information of all of one or more UEs that are currently scheduled, and the first frequency domain resource indicator information may be used to indicate whether a specified bandwidth position on the total bandwidth is scheduled.

In an exemplary embodiment, the first frequency domain resource indicator information may indicate, through a bitmap having a fixed number of bits, whether the specified bandwidth position on the total bandwidth is scheduled. In another exemplary embodiment, the first frequency domain resource indicator information may be further used to indicate a bandwidth applied to the user specific scheduling information area and occupied by data corresponding to the scheduling information.

In an exemplary embodiment, the first type of scheduling information may further include second frequency domain resource indicator information of each piece of the second type of scheduling information. The second frequency domain resource indicator information may be used to indicate that all the second type of scheduling information occupies a same bandwidth value or occupies different bandwidth values.

In an exemplary embodiment, the first type of scheduling information may further include first time domain resource indicator information of the user specific scheduling information area or second time domain resource indicator information of each piece of the second type of scheduling information. The first time domain resource indicator information may be used to indicate a first start time and/or a first time domain duration of the user specific scheduling information area, and the second time domain resource indicator information may be used to indicate a second start time and/or a second time domain duration of each piece of the user specific scheduling information.

There may be many manners for configuring the first start time or the second start time. In an exemplary embodiment, when the first start time or the second start time is used to indicate that adoption of a predefined time is supported, it may not be needed to configure the first start time or the second start time. When the first start time or the second start time is used to indicate that sharing of one start time among different frequency bands is supported, the first start time or the second start time may be configured uniformly. When the first start time or the second start time is used to indicate that adoption of different start times for different frequency bands is supported, the first start time or the second start time may be configured separately.

There may also be many manners for configuring the first time domain duration or the second time domain duration. In an exemplary embodiment, when the first time domain duration or the second time domain duration supports adoption of a predefined time length for the user specific scheduling information area and/or each piece of the second type of scheduling information, it may not be needed to configure the first time domain duration or the second time domain duration. In a condition that the second time domain duration supports a fixed content length for the user specific scheduling information, and a frequency domain width of the second type of scheduling information is known, a time domain duration of each piece of the second type of scheduling information may be calculated and it may not be needed to configure the second time domain duration; and in a condition that a content length of the second type of scheduling information is known and a frequency domain width of the second type of scheduling information is known, a time domain duration of each piece of the second type of scheduling information may be calculated and it may not be needed to configure the second time domain duration.

In an exemplary embodiment, the first type of scheduling information may further include a group number, and the group number may be used to indicate a group to which the one or more UEs that are currently scheduled belong.

There may also be many manners for grouping of the one or more UEs. In an exemplary embodiment, a remainder may be determined after dividing an AID of each UE by the number of groups, and one or more UEs with the same remainders may be put into to the same group. Alternatively or additionally, one or more UEs whose predefined UE IDs begin with the same digits, the number of the digits being a predetermined number, may be put into the same group.

In an exemplary embodiment, the second type of scheduling information may include user identifier information or resource position indicator information of user data. In this exemplary embodiment, the user identifier information may include AID and/or user PAID, and the resource position indicator information of the user data may include frequency domain indicator information and/or time domain indicator information.

In an exemplary embodiment, the second type of scheduling information may include user data modulation code rate, data packet length, the number of spatial streams, and indicator information used to indicate whether STBC is activated.

In an exemplary embodiment, the first type of scheduling information may be public scheduling information, and the second type of scheduling information may be user specific scheduling information.

A device for transmitting scheduling information is provided in an exemplary embodiment. The device may be configured to implement the above exemplary embodiments and exemplary implementations, and what has been described above is not repeated below. Terms used below such as module may realize the combination of software and/or hardware with predefined functions. Although the device described in the following exemplary embodiments may be preferably implemented in the form of software, the implementation in the form of hardware or the combination of software and hardware is possible and conceived.

Figure 4:
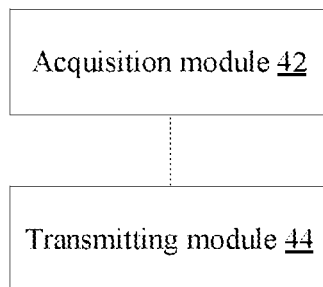
FIG. 4 is a structure diagram illustrating a device for transmitting scheduling information according to an exemplary embodiment of the present disclosure.

FIG. 4 is a structure diagram illustrating a device for transmitting scheduling information according to an exemplary embodiment of the present disclosure. As shown in FIG. 4, the device may include: an acquisition module 42 and a transmitting module 44. The acquisition module 42 may be configured to acquire information about a scheduling result of resources to be occupied by one or more UEs. The transmitting module 44 may be configured to transmit, according to the information about the scheduling result, scheduling information including a first type of scheduling information and a second type of scheduling information to the one or more UEs. In the exemplary embodiment, the first type of scheduling information may include information for parsing the second type of scheduling information, and the scheduling information may determine a resource scheduling condition of the one or more UEs.

In an exemplary embodiment, the first type of scheduling information may include first frequency domain resource indicator information of a user specific scheduling information area. In this exemplary embodiment, the user specific scheduling information area may refer to an entire bandwidth area occupied by user specific scheduling information of all of one or more UEs that are currently scheduled, and the first frequency domain resource indicator information may be used to indicate whether a specified bandwidth position on a total bandwidth is scheduled.

In an exemplary embodiment, the first frequency domain resource indicator information may indicate, through a bitmap having a fixed number of bits, whether the specified bandwidth position on the total bandwidth is scheduled.

In an exemplary embodiment, the first frequency domain resource indicator information may be further used to indicate a bandwidth applied to the user specific scheduling information area and occupied by data corresponding to the scheduling information.

In an exemplary embodiment, the first type of scheduling information may further include second frequency domain resource indicator information of each piece of the second type of scheduling information. The second frequency domain resource indicator information may be used to indicate that all the second type of scheduling information occupies a same bandwidth value or occupies different bandwidth values.

In an exemplary embodiment, the first type of scheduling information may further include at least one of the following information: first time domain resource indicator information of the user specific scheduling information area, second time domain resource indicator information of each piece of the second type of scheduling information. The first time domain resource indicator information may be used to indicate a first start time and/or a first time domain duration of the user specific scheduling information area, and the second time domain resource indicator information may be used to indicate a second start time and/or a second time domain duration of each piece of the second type of scheduling information.

In an exemplary embodiment, the first start time or the second start time may be configured in one of the following manners. When the first start time or the second start time is used to indicate that adoption of a predefined time is supported, it may not be needed to configure the first start time or the second start time. When the first start time or the second start time is used to indicate that sharing of one start time among different frequency bands is supported, the first start time or the second start time may be configured uniformly. When the first start time or the second start time is used to indicate that adoption of different start times for different frequency bands is supported, the first start time or the second start time may be configured separately.

In an exemplary embodiment, the first time domain duration or the second time domain duration may be configured in one of the following manners. When the first time domain duration or the second time domain duration supports adoption of a predefined time length for the user specific scheduling information area and/or each piece of the second type of scheduling information, it may not be needed to configure the first time domain duration or the second time domain duration. In a condition that the second time domain duration supports a fixed content length for the user specific scheduling information, and a frequency domain width of the second type of scheduling information is known, a time domain duration of each piece of the second type of scheduling information may be calculated and it may not be needed to configure the second time domain duration; and in a condition that a content length of the second type of scheduling information is known and a frequency domain width of the second type of scheduling information is known, a time domain duration of each piece of the second type of scheduling information may be calculated and it may not be needed to configure the second time domain duration.

In an exemplary embodiment, the first type of scheduling information may further include a group number, and the group number may be used to indicate a group to which the one or more UEs that are currently scheduled belong.

In an exemplary embodiment, grouping of the one or more UEs may be implemented in at least one of the following manners. A remainder after dividing an AID of each UE by the number of groups may be determined, and one or more UEs with the same remainders may be put into the same group. One or more UEs whose predefined UE IDs begin with the same digits, the number of the digits being a predetermined number, may be put into the same group.

In an exemplary embodiment, the second type of scheduling information may include at least one of the following information: user identifier information and resource position indicator information of user data. In this exemplary embodiment, the user identifier information may include AID and/or user PAID, and the resource position indicator information of the user data may include frequency domain indicator information and/or time domain indicator information.

In an exemplary embodiment, the second type of scheduling information may include at least one of the following information: user data modulation code rate, data packet length, the number of spatial streams, and indicator information used to indicate whether STBC is activated.

In an exemplary embodiment, the first type of scheduling information may be public scheduling information, and the second type of scheduling information may be user specific scheduling information.

Figure 5:
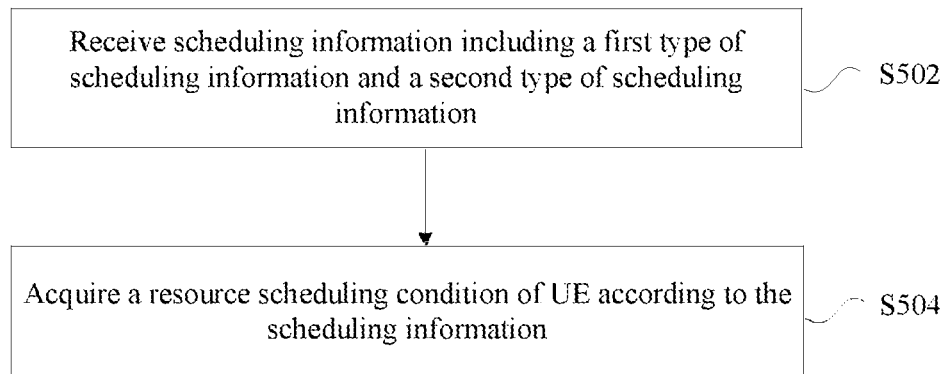
FIG. 5 is a flowchart illustrating a method for receiving scheduling information according to an exemplary embodiment of the present disclosure.

A method for receiving scheduling information is provided in this exemplary embodiment. FIG. 5 is a flowchart illustrating a method for receiving scheduling information according to an exemplary embodiment of the present disclosure. As shown in FIG. 5, the flow may include the following acts S502 and S504.

At act S502, a UE may receive scheduling information including a first type of scheduling information and a second type of scheduling information. The first type of scheduling information may include information for parsing the second type of scheduling information.

At act S504, the UE may acquire a resource scheduling condition of the UE according to the scheduling information.

Through the above acts, the UE may receive the scheduling information including the first type of scheduling information and the second type of scheduling information, so that the UE may parse the user specific information according to the above scheduling information. By virtue of this solution, a problem of how public information indicates a receiving end to parse the user specific information may be solved, and an effect that the public information indicates the receiving end to parse the user specific information may be realized.

In an exemplary embodiment, the first type of scheduling information may include first frequency domain resource indicator information of a user specific scheduling information area. In this exemplary embodiment, the user specific scheduling information area may refer to an entire bandwidth area occupied by user specific scheduling information of all of one or more UEs that are currently scheduled, and the first frequency domain resource indicator information may be used to indicate whether a specified bandwidth position on a total bandwidth is scheduled.

In an exemplary embodiment, the first type of scheduling information may be public scheduling information, and the second type of scheduling information may be user specific scheduling information.

A device for receiving scheduling information is provided in this exemplary embodiment. The device may be configured to implement the above exemplary embodiments and exemplary implementations, and what has been described above is not repeated below. Terms used below such as module may realize the combination of software and/or hardware with predefined functions. Although the device described in the following exemplary embodiments may be preferably implemented in the form of software, the implementation in the form of hardware or the combination of software and hardware is possible and conceived.

Figure 6:
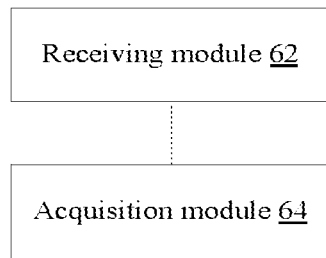
FIG. 6 is a structure diagram illustrating a device for receiving scheduling information according to an exemplary embodiment of the present disclosure.

FIG. 6 is a structure diagram illustrating a device for receiving scheduling information according to an exemplary embodiment of the present disclosure. As shown in FIG. 6, the device may include: a receiving module 62 and an acquisition module 64. The receiving module 62 may be configured to receive scheduling information including a first type of scheduling information and a second type of scheduling information, where the first type of scheduling information may include information for parsing the second type of scheduling information. The acquisition module 64 may be configured to acquire a resource scheduling condition of a UE according to the scheduling information by the UE.

In an exemplary embodiment, the first type of scheduling information may include first frequency domain resource indicator information of a user specific scheduling information area. In this exemplary embodiment, the user specific scheduling information area may refer to an entire bandwidth area occupied by user specific scheduling information of all of one or more UEs that are currently scheduled, and the first frequency domain resource indicator information may be used to indicate whether a specified bandwidth position on the total bandwidth is scheduled.

In an exemplary embodiment, the first type of scheduling information may be public scheduling information, and the second type of scheduling information may be user specific scheduling information.

It should be noted that each of the above modules may be realized through software or hardware, and the latter one may be realized, without limitation, through the following manners. Each of the above modules may be located in the same processor; or, each of the above modules may be located in a first processor, a second processor, a third processor . . . respectively.

In view of the above problem, a description is given below in conjunction with detailed exemplary embodiments, and the following exemplary embodiments may combine the above exemplary embodiments and exemplary implementations thereof.

In order to solve the above problem, this exemplary embodiment provides a method for transmitting scheduling indicator information, which may include the following content.

A transmitting end may indicate, in public scheduling indicator information and one or more pieces of user specific scheduling information according to a scheduling result, users to share resources by way of OFDMA or MU-MIMO. The public scheduling indicator information may include information needed to parse the user specific scheduling information. The public scheduling indicator information may be repeatedly transmitted on different sub-channels of a large bandwidth. The user specific scheduling information in total may occupy the entire scheduled frequency band resources, and each piece of the user specific scheduling information may occupy less than or equal to the entire scheduled frequency band resources.

The above public scheduling indicator information may at least include frequency domain resource indicator information of a user specific scheduling information area.

The above user specific scheduling information area may refer to an entire area occupied by user specific scheduling information of all of one or more UEs that are currently scheduled.

The above frequency domain indicator information may indicate, through a bitmap having a fixed number of bits, whether a corresponding bandwidth position on a total bandwidth is scheduled.

In an exemplary embodiment, the bandwidth indicated by the frequency domain may be applied to the entire user specific scheduling information area and the bandwidth occupied by data corresponding to the scheduling information.

The above public scheduling indicator information may also include frequency domain resource indicator information of each piece of user specific scheduling information.

For the specific scheduling information of each user, the frequency domain indication method may support that all the user specific scheduling information occupies one same preconfigured bandwidth value, and the preconfigured bandwidth value may be, but not limited to, e.g., 20 MHz, or 5 MHz.

For the specific scheduling information of each user, the frequency domain indication method may support that all the user specific scheduling information occupies one same configurable bandwidth value, and the configurable bandwidth value may be, but not limited to, e.g., 20 MHz, 10 MHz or 5 MHz.

For the specific scheduling information of each user, the frequency domain indication method may support that all the user specific scheduling information occupies different bandwidth values, which may be configurable for each user, and the bandwidth values may be, but not limited to, e.g., 40 MHz, 20 MHz, 10 MHz or 5 MHz. If the bandwidth is greater than 20 MHz, repetition of 20 MHz may be conducted on the indicated bandwidth, or an actual larger bandwidth may be occupied without repetition. The bandwidths of different user specific scheduling information may be only listed in a certain sequence, and for example, the bandwidths of different user specific scheduling information may be listed according to the sequence of a default channelization solution.

When the bandwidth of the user specific scheduling information is configured with 20 MHz as a unit, only one bandwidth value may be selected for each 20 MHz, and the bandwidth value may be, but not limited to, e.g., 20 MHz, 10 MHz or 5 MHz. When the bandwidth value is configured to be less than 20 MHz, multiple pieces of user specific scheduling information may be accommodated in the bandwidth, herein, the multiple pieces of user scheduling information may belong to one same user, may also belong to multiple different users.

The above public scheduling indicator information may include time domain resource indicator information of the user specific scheduling information area and/or time domain resource indicator information of each piece of the second type of scheduling information.

The above time domain indicator information may include a start position of the user specific scheduling information area and/or a length of the time domain duration.

The above time domain indicator information may include a time domain start position of each user specific scheduling information area and/or a length of the time domain duration.

The time domain start time may indicate that adoption of a predefined start time is supported, and is not necessary to be configured.

The time domain start time may indicate that each frequency band is supported sharing one start time and is uniformly configured. The time configuration may adopt a direct configuration manner, for example, a deviation value from the end of the first type of scheduling information domain to the start time, or, just providing some parameters of variable-length areas, e.g., relevant parameters of HE-LTF. The receiving end may calculate a public start time according to these parameters.

The time domain start time may indicate that each frequency band is supported using different start times and is separately configured. The time configuration may adopt a direct configuration manner, for example, a deviation value from the end of the first type of scheduling information domain to the start time of the user specific scheduling information on the bandwidth of each piece of user specific scheduling information, or, just providing some parameters of variable-length areas, e.g., relevant parameters of HE-LTF. The receiving end may calculate a start time for each piece of user specific scheduling information to be decoded according to these parameters.

The time domain duration may indicate that adoption of a predefined time length to both the user specific scheduling information area and each piece of user specific scheduling information is supported, and is not necessary to be configured.

The time domain duration may indicate that adoption of a configuration mode for the user specific scheduling information area is supported.

The time domain duration may indicate that the duration length of each piece of user specific scheduling information may be calculated without the necessity of configuration in a condition that a fixed content length of the user specific scheduling information is supported and the frequency domain width is known.

The time domain duration may indicate that the duration length of each piece of user specific scheduling information may be calculated without the necessity of configuration in a condition that the frequency domain width is known when the content length of the user specific scheduling information is configurable and the length configuration is known.

The receiving end may receive the public scheduling indicator information, parse the public scheduling indicator information and obtain the indicated resource position information of the user specific scheduling information area and/or the indicated resource position information of each piece of user scheduling information, and may try to demodulate one by one the scheduling information of each user on the intersection of sub-channels supported by both the transmitting end and the receiving end.

In an exemplary embodiment, detection may be stopped when a user's scheduling information is successfully demodulated.

The public scheduling indicator information may also carry a group number to support user group scheduling, indicating that users currently scheduled all belong to the group.

A grouping method may be: first determining the number of groups, then putting the users whose AIDs modulo the number of groups are the same into one group.

Another grouping method may be: putting the users, having predefined user IDs which begin with the same digits, into one group.

After the receiving end receives the scheduling information, if the receiving end determines that the receiving end itself belongs to the group, the receiving end may continue decoding, otherwise, the receiving end may choose to continue receiving or to sleep till the end point of the frame.

The user specific scheduling information may at least include user identifier information, and resource position indicator information of user data.

The above user identifier information may be a user PAID or a user AID.

In order to reduce the overhead of the user identifier information, the user identifier information may be divided into two parts: the above public scheduling indicator information may carry information relevant to part bits of a Basic Service Set (BSSID), and/or each BSS may be assigned with an identifier value as different from surrounding stations as possible, or the above two parts may be synthesized into a comprehensive value through certain algorithm. At this time, the user specific scheduling information may carry part of the AID or PAID having fewer bits.

The resource position indicator information of the user data may include frequency domain indicator information and possible existing time domain indicator information.

One method for indicating the frequency domain indicator information is to divide the frequency domain indicator information into two parts: a bitmap of 20 MHz level and a bitmap of smaller-granularity bandwidth level. The number of bits in the bitmap of 20 MHz level may depend on the bandwidth currently supported by an Access Point (AP) or the maximum bandwidth, and the number of bits in the bitmap of smaller-granularity bandwidth level may depend on the number of smaller-granularity bandwidths included in 20 MHz. For example, 8 bits may be used to indicate which 20 MHz sub-channels the allocated resources are located on in a 160 MHz bandwidth, and another 4-bit bitmap may be used to indicate, on each occupied 20 MHz sub-channel, which 5 MHz bandwidths are allocated.

The time domain indicator information may include a start time and a duration length of the user data. When the user is able to calculate the data start time through predefined information or other information in the user specific scheduling information, it may not be needed to indicate the start time. When the user is able to calculate the duration length of the user data through predefined information or other information in the user specific scheduling information, it may not be needed to indicate the duration length.

The user specific scheduling information may also include user data modulation code rate, data packet length, the number of spatial streams, indicator information used to indicate whether STBC is activated, or other relevant information for decoding data.

Figure 7:
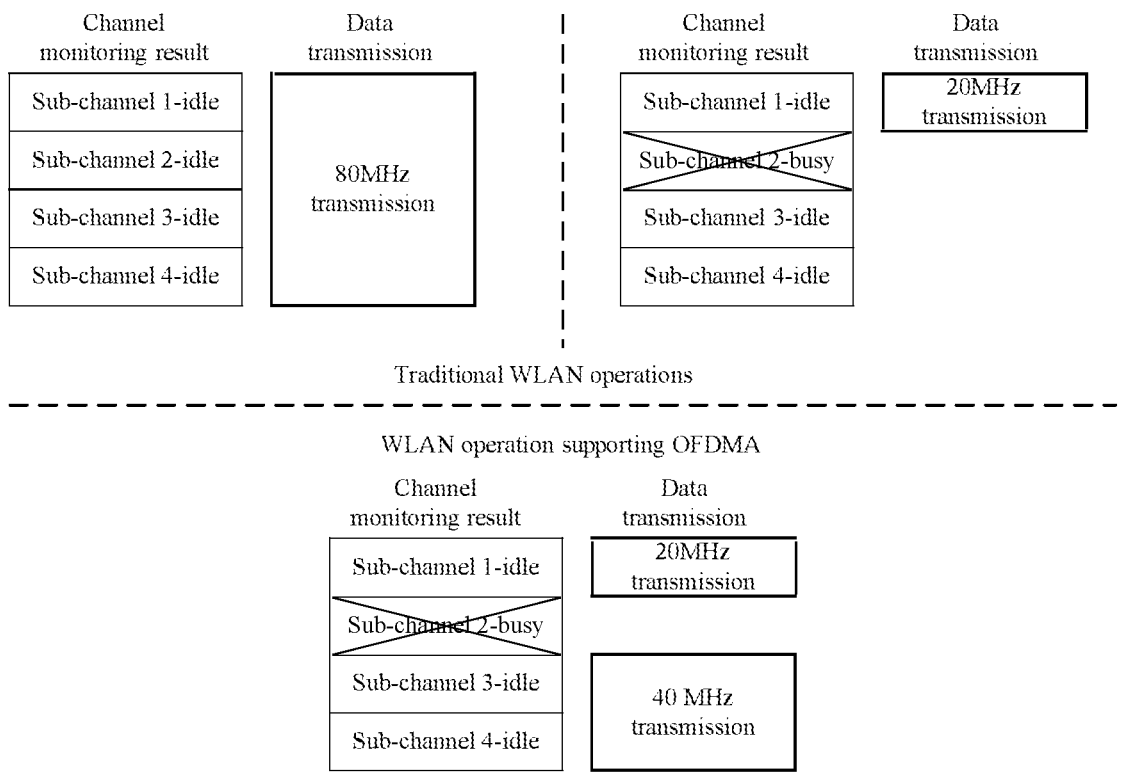
FIG. 7 is a diagram illustrating data transmission according to an exemplary embodiment of the present disclosure.

The size of the user specific scheduling information may support several fixed types, and the distinguishing of the types may be relevant to the maximum bandwidth supported by the AP, MIMO parameters of data, etc. When several types are supported, the above public scheduling indicator information may need to indicate a uniform user specific scheduling information type, or to indicate the user specific scheduling information type in view of different positions respectively. FIG. 7 is a diagram illustrating data transmission according to an exemplary embodiment of the present disclosure.

In traditional WLAN networks, the AP or the Station (STA) may need to monitor whether the channel is idle before transmitting data, and the data may be transmitted only when the channel is detected to be idle and still idle after certain back-off time. This mechanism is called Carrier Sense Multiple Access/Collision Avoidance (CSMA/CA). IEEE802.11n and IEEE802.11ac support large-bandwidth operations, for example, greater than 20 MHz bandwidth. The premise of the large-bandwidth application is that all monitoring results on the applied bandwidth are idle, for example, 40 MHz, 80 MHz, and continuous 160 MHz all need a continuous idle bandwidth. The premise of the discontinuous 160 MHz bandwidth application is also two continuous idle 80 MHz. If there is partial unavailable bandwidth, the large bandwidth cannot be used. As shown in FIG. 7, each sub-channel is 20 MHz, and sub-channel 1 is a main channel, if all the channel monitoring results are idle, the data may be transmitted through an 80 MHz bandwidth. If the sub-channel 2 is unavailable, only the 20 MHz of the main channel may be used. However, the next generation WLAN technology of the OFDMA mechanism may support the discontinuous bandwidth transmission shown in the lower part of FIG. 7, that is, even if there is 20 MHz unavailable in 80 MHz, the rest 60 MHz may still be used to transmit data.

In this exemplary embodiment, at the transmitting end, an AP may monitor the surrounding condition to determine whether its channel is idle. Users may be indicated, in public scheduling indicator information and one or more pieces of user specific scheduling information according to a scheduling result, to share resources by way of OFDMA or MU-MIMO. The above public scheduling indicator information may include information needed to parse the above user specific scheduling information. The public scheduling indicator information may be repeatedly transmitted on different sub-channels of a large bandwidth. The user specific scheduling information in total may occupy the entire scheduled frequency band resources, and each piece of the user specific scheduling information may occupy less than or equal to the scheduled frequency band resource.

Figure 8:
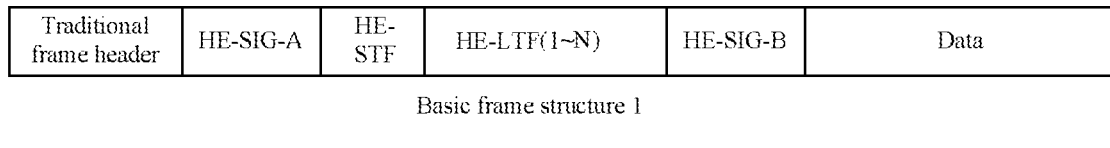
FIG. 8 is a diagram illustrating a first basic frame structure according to an exemplary embodiment of the present disclosure.

FIG. 8 is a diagram illustrating a first basic frame structure according to an exemplary embodiment of the present disclosure. As shown in FIG. 8, the basic frame structure 1 is the basic frame structure of the exemplary embodiment of the present disclosure, including a traditional frame header part (same to L-STF, L-LTF, L-SIG in the frame structure of IEEE802.11n and IEEE802.11ac), HE-SIG-A, HE-STF, HE-LTF, HE-SIG-B and a data area. Herein, the HE-LTF may be variable in length depending on the number of spatial streams or the number of antennas, for example, each spatial stream corresponds to one OFDM symbol length in the time domain, if a maximum number N of spatial streams is supported, the maximum number of HE-LTF fields may be N OFDM symbol lengths. The HE-SIG-A may bear the public scheduling indicator information, and the HE-SIG-B may bear the user specific scheduling information related to users. The HE-SIG-A may indicate the overall position information of the HE-SIG-B and the position information of the HE-SIG-B of each user.

Figure 9:
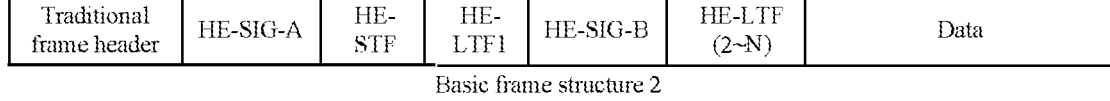
FIG. 9 is a diagram illustrating a second basic frame structure according to an exemplary embodiment of the present disclosure.

FIG. 9 is a diagram illustrating a second basic frame structure according to an exemplary embodiment of the present disclosure. As shown in FIG. 9, the basic frame structure 2 is another basic frame structure of the exemplary embodiment of the present disclosure, including a traditional frame header part (same to L-STF, L-LTF, L-SIG in the frame structure of IEEE802.11n and IEEE802.11ac), HE-SIG-A, HE-STF, HE-LTF, HE-SIG-B and a data area. Different from the frame structure 1, in the basic frame structure 2 the HE-LTF may be divided into two parts in time domain. HE-LTF1 may represent the channel sounding signals of a fixed number (one or more than one) of spatial streams, occupying one OFDM symbol in time domain, or probably occupying several OFDM symbols in time domain so as to enhance the robustness of the subsequent HE-SIG-B. Behind the HE-LTF1 is the HE-SIG-B, and in the next time domain position is placed the rest part of the HE-LTF, the maximum number is N in FIG. 9.

In order to indicate the receiving end to correctly receive the scheduling information of data, the scheduling information may be divided into two parts in the exemplary embodiment of the present disclosure: public scheduling indicator information and user specific scheduling information. As shown in FIG. 9, HE-SIG-A is the public scheduling indicator information, HE-SIG-B is the user specific scheduling information area. The user specific scheduling information area may be the entire area occupied by user specific scheduling information of all the users currently scheduled, and may include the user specific scheduling information of one or more than one user.

Herein, the public scheduling indicator information HE-SIG-A may at least include the frequency domain resource indicator information of the user specific scheduling information area HE-SIG-B. The user specific scheduling information area may refer to an entire area occupied by user specific scheduling information of all the users currently scheduled. The above frequency domain indicator information may indicate, through a bitmap having a fixed number of bits, whether a corresponding bandwidth position on the total bandwidth is scheduled. For example, each bit of an 8-bit bitmap may represent the availability condition of one 20 MHz sub-channel, so as to indicate whether the sub-channels in the range of 160 MHz are available. In an exemplary embodiment, the bandwidth indicated by this frequency domain may be applied to the entire user specific scheduling information area and the bandwidth occupied by data corresponding to the scheduling information.

In addition, the public scheduling information may further include the frequency domain resource indicator information of each piece of user specific scheduling information.

For the specific scheduling information of each user, the frequency domain indication method may support that all the user specific scheduling information occupies one same preconfigured bandwidth value, and the preconfigured bandwidth value may be, but not limited to, e.g., 20 MHz, or 5 MHz. As shown in FIG. 9, the HE-SIG-B of each user may occupy a 20 MHz HE-SIG-B area, that is, each user specific scheduling information block may be of the same time-frequency size.

For the specific scheduling information of each user, the frequency domain indication method may support that all the user specific scheduling information occupies one same configurable bandwidth value, and the configurable bandwidth value may be, but not limited to, e.g., 20 MHz, 10 MHz or 5 MHz. For example, each piece of user specific scheduling information may be sorted in a frequency domain sequence, each piece of information occupying 2-bit indicator bandwidth information.

For the specific scheduling information of each user, the frequency domain indication method may support that all the user specific scheduling information occupies different bandwidth values, which may be configurable for each user, and the bandwidth values may be, but not limited to, e.g., 40 MHz, 20 MHz, 10 MHz or 5 MHz. If the bandwidth is greater than 20 MHz, repetition of 20 MHz may be conducted on the indicated bandwidth, or an actual larger bandwidth is occupied. The bandwidths of different user specific scheduling information may be only listed in a certain sequence, and for example, the bandwidths of different user specific scheduling information may be listed according to the sequence of a default channelization solution. If each user uses 3 bit information to indicate any one configuration of 40 MHz, 20 MHz, 10 MHz or 5 MHz, in order to save overhead, the user ID information is not indicated. If the bandwidth is greater than 20 MHz, repetition of 20 MHz may be conducted on the indicated bandwidth, or an actual larger bandwidth is occupied.

When the bandwidth of the user specific scheduling information is configured with 20 MHz as a unit, only one bandwidth value may be selected for each 20 MHz, and the bandwidth value may be, but not limited to, e.g., 20 MHz, 10 MHz or 5 MHz. When the bandwidth value is configured to be less than 20 MHz, multiple pieces of user specific scheduling information may be accommodated in the bandwidth, herein, the multiple pieces of user scheduling information may belong to one same user, may also belong to multiple different users. If there are 3 data in 20 MHz arranged according to 5 MHz, 5 MHz and 10 MHz, the SIG-B may have the same bandwidth as the corresponding data, in this indication, the SIG-B of 10 MHz may adopt a repetition manner with 5 MHz as a unit. For a bandwidth greater than 20M, SIG-B may adopt a repetition manner with 20M as a unit.

The public scheduling indicator information may further include time domain resource indicator information of the user specific scheduling information area and/or time domain resource indicator information of each piece of user specific scheduling information.

The above time domain indicator information may include a start position of the user specific scheduling information area and/or a length of the time domain duration.

The above time domain indicator information may include a time domain start position of each user specific scheduling information area and/or a length of the time domain duration.

The time domain start time may indicate that adoption of a predefined start time is supported, and is not necessary to be configured. For example, starting from HE-LTF1 in FIG. 8, the length of HE-LTF1 may be predefined.

The time domain start time may indicate that each frequency band is supported sharing one start time and is uniformly configured, which is a situation of time domain alignment of HE-LTF on each bandwidth. The time configuration may adopt a direct configuration manner, for example, a deviation value from the end of the first type of scheduling information domain to the start time, or, just providing some parameters of variable-length areas, e.g., relevant parameters of HE-LTF. The receiving end may calculate a public start time according to these parameters.

The time domain start time may indicate that each frequency band is supported using different start times and is separately configured, which is a situation of time domain non-alignment of HE-LTF on each frequency band. The time configuration may adopt a direct configuration manner, for example, a deviation value from the end of the first type of scheduling information domain to the start time of the user specific scheduling information on the bandwidth of each piece of user specific scheduling information, or, just providing some parameters of variable-length areas, e.g., relevant parameters of HE-LTF. The receiving end may calculate a start time for each piece of user specific scheduling information to be decoded according to these parameters.

The time domain duration may indicate that adoption of a predefined time length to both the user specific scheduling information area and each piece of user specific scheduling information is supported, and is not necessary to be configured.

The time domain duration may indicate that adoption of a configuration mode for the user specific scheduling information area is supported.

The time domain duration may indicate that the duration length of each piece of user specific scheduling information may be calculated without the necessity of configuration in a condition that a fixed content length of the user specific scheduling information is supported and the frequency domain width is known. The time domain duration of each HE-SIG-B may be calculated according to the content and bandwidth of each HE-SIG-B.

The time domain duration may indicate that the duration length of each piece of user specific scheduling information may be calculated without the necessity of configuration in a condition that the frequency domain width is known when the content length of the user specific scheduling information is configurable and the length configuration is known. The time domain duration of each HE-SIG-B may be calculated according to the content and bandwidth of each HE-SIG-B.

The receiving end may receive the public scheduling indicator information, parse the public scheduling indicator information and obtain the indicated resource position information of the user specific scheduling information area and/or the indicated resource position information of each piece of user scheduling information, and may try to demodulate one by one the scheduling information of each user on the intersection of sub-channels supported by both the transmitting end and the receiving end.

Preferably, detection may be stopped when a user's scheduling information is successfully demodulated.

By utilizing the exemplary embodiments of the present disclosure, flexible transmission of scheduling information on multiple bandwidth granularities may be supported, and resource sharing between scheduling information and data may be supported to some extent, thus the resource utilization is high.

Other details of this exemplary embodiment are described in specific exemplary embodiments.

First Exemplary Embodiment

Figure 10:
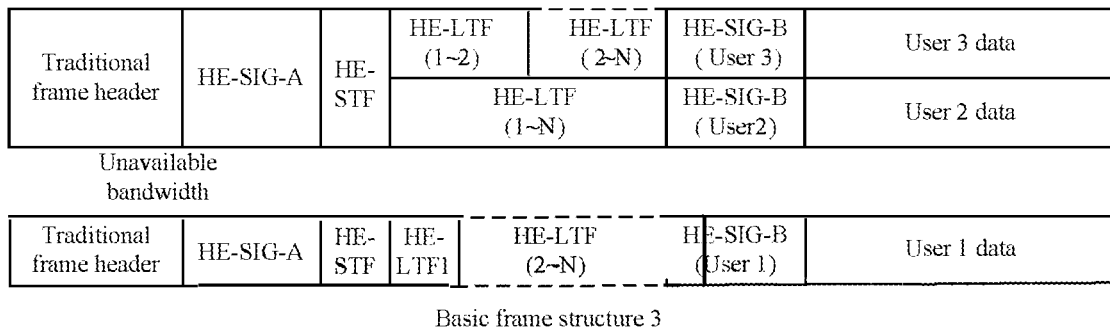
FIG. 10 is a diagram illustrating a third basic frame structure according to an exemplary embodiment of the present disclosure.

FIG. 10 is a diagram illustrating a third basic frame structure according to an exemplary embodiment of the present disclosure. FIG. 10 shows a frame structure of the exemplary embodiment of the present disclosure in large-bandwidth application. The exemplary embodiment of the present disclosure may support discontinuous bandwidth, for example, in FIG. 10 there is partial unavailable bandwidth. The traditional frame header part is the same as the processing method of large bandwidth in IEEE802.11n or IEEE802.11ac, only the unavailable bandwidth part is subjected to special processing, for example, the subcarriers of these bandwidths may be set as 0. HE-SIG-A may be placed in the 20 MHz main sub-channel, and may be repeatedly transmitted on other sub-channels.

HE-STF may be processed to be repeated with the 20 MHz sub-channel as a unit, each 20 MHz may support a 312.5 kHz WLAN traditional subcarrier interval of 64-point FFT, or each 20 MHz may support a 78.125 kHz subcarrier interval of 256-point FFT. HE-STF time domain may occupy one 01-DM symbol length.

Behind the HT-STF is an HE-LTF field, in this exemplary embodiment the numbers of HE-LTFs on multiple bandwidths may be aligned in time domain based on the longest one on each bandwidth. The HE-LTF may support the same number of FFT points as the data part. The same as the data part, the HE-LTF may support 256-point FFT or 64-point FFT in each 20 MHz.

The information of the HE-SIG-A may be indicated for all users, including necessary information used for indicating a user to detect the HE-SIG-B. In this exemplary embodiment, the HE-SIG-A may include the following information.

The HE-SIG-A may include frequency domain resource indicator information of the user specific scheduling information area HE-SIG-B. For example, 8 bits may be used to indicate the availability condition of each 20 MHz sub-channel of 160 MHz. If the vertical axis represents the frequency domain in FIG. 10, the bitmap is 10110000 indicated from bottom up, a higher frequency domain of 80 MHz is not shown in FIG. 10, which is supposed to be unavailable.

For the specific frequency domain scheduling information of each user, the values may be the same in this exemplary embodiment, a predefinition or indication method may be adopted, and, in FIG. 10, the value is 20 MHz.

The time domain resource indicator information of the user specific scheduling information area HE-SIG-B may be divided into a time domain start position and a time domain duration length. The time domain start position may be determined by the number of HE-LTFs after alignment. The time domain duration length may be the standard length of one piece of 20 MHz-width user specific information, for example, one or more OFDM symbols.

The time domain resource indicator information of the user specific scheduling information may also be divided into a time domain start position and a time domain duration length. In this exemplary embodiment, there may be three users whose user specific scheduling information is aligned in time domain. The start position may be determined by default from the number of HT-LTFs after alignment, also the time domain start position of the user specific scheduling information on each bandwidth may be configured separately. In this embodiment, the value configured separately may be the same. The time domain duration of the user specific scheduling information of the three users in this exemplary embodiment may be the same, therefore, a default length may be adopted. That is, the time domain duration may be configured based on the time duration of one piece of standard HE-SIG-B scheduling information of a user on 20 MHz, or, the time domain duration of the user specific scheduling information of each user may be configured separately. The values configured for different users may be the same.

The HE-SIG-B may have one piece of information for each user, the bandwidth being consistent with the corresponding user. The HE-SIG-B may include necessary information for the user to decode the data, at least including a user identifier.

For single-user scheduling information, the user identifier may be the AID or PAID of the user. For multi-user scheduling information, for example, MU-MIMO, the ID may be the group ID of the MU-MIMO, and the specific users indicated may be determined by a group management mechanism. In order to reduce the overhead of the user identifier information, the user identifier information may be divided into two parts: the above public scheduling indicator information may carry information relevant to part bits of a BSSID, and/or each BSS may be assigned with an identifier value as different from surrounding stations as possible, or the above two parts may be synthesized into a comprehensive value through certain algorithm. At this time, the user specific scheduling information may carry part of the AID or PAID having fewer bits.

The resource position indicator information of the user data may include frequency domain indicator information and possible existing time domain indicator information.

One method for indicating the frequency domain indicator information is to divide the frequency domain indicator information into two parts: a bitmap of 20 MHz level and a bitmap of smaller-granularity bandwidth level. The number of bits in the bitmap of 20 MHz level may depend on the bandwidth currently supported by the AP or the maximum bandwidth, and the number of bits in the bitmap of smaller-granularity bandwidth level may depend on the number of smaller-granularity bandwidths included in 20 MHz. For example, 8 bits may be used to indicate which 20 MHz sub-channels the allocated resources are located on in a 160 MHz bandwidth, and another 4-bit bitmap may be used to indicate, on each occupied 20 MHz sub-channel, which 5 MHz bandwidths are allocated.

The time domain indicator information may include a start time and a duration length of the user data. When the user is able to calculate the data start time through predefined information or other information in the user specific scheduling information, it may not be needed to indicate the start time. When the user is able to calculate the duration length of the user data through predefined information or other information in the user specific scheduling information, it may not be needed to indicate the duration length.

The user specific scheduling information may also include user data modulation code rate, data packet length, the number of spatial streams, indicator information used to indicate whether STBC is activated, or other relevant information for decoding data.

Second Exemplary Embodiment

Figure 11:
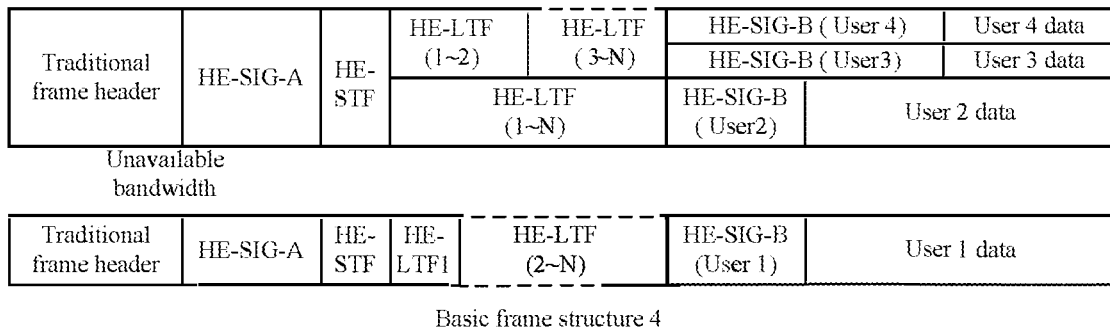
FIG. 11 is a diagram illustrating a fourth basic frame structure according to an exemplary embodiment of the present disclosure.

FIG. 11 is a diagram illustrating a fourth basic frame structure according to an exemplary embodiment of the present disclosure. FIG. 11 shows another frame structure of the exemplary embodiment of the present disclosure in large-bandwidth application. The difference from the above exemplary embodiment lies in that transmission of user data on a smaller bandwidth is supported and the corresponding HE-SIG-B also occupies a corresponding smaller bandwidth. For example, in FIG. 11 the HE-SIG-B of Users 3 and 4 may occupy half of the sub-channel bandwidth respectively, and behind are bandwidth equivalent data corresponding to respective user.

Figure 12:
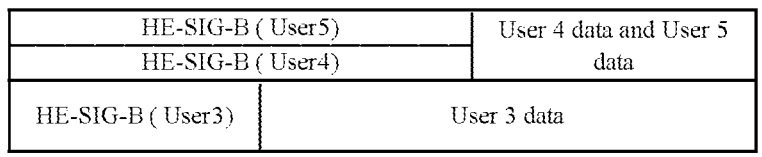
FIG. 12 is a diagram illustrating a fifth basic frame structure according to an exemplary embodiment of the present disclosure.

FIG. 12 is a diagram illustrating a fifth basic frame structure according to an exemplary embodiment of the present disclosure. The frame structure 5 shown in FIG. 12 is a partial detailed expansion of the frame structure 4. Three users share one sub-channel. Herein, the User 3 may occupy half of the sub-channel, the HE-SIG-B of Users 4 and 5 may occupy ¼ of the sub-channel separately. The sharing manner of the data part may be OFDMA or MU-MIMO.

HE-SIG-A may indicate:
  a frequency domain available bandwidth, which is the same as the above exemplary embodiment; and
  a time domain start position of the HE-SIG-B area, which is indirectly indicated by the maximum number N of HE-LTFs.

In view of the frame structure 4, a frequency domain width of the HE-SIG-B of four users may be indicated, which, starting from the sub-channel 1, is 20 MHz, 20 MHz, 10 MHz and 10 MHz in turn. Herein, the HE-SIG-A only indicates width, and does not indicate position or user ID.

In view of the frame structure 5, the bandwidth of the HE-SIG-B part of Users 3, 4 and 5 may be replaced by 10 MHz, 5 MHz and 5 MHz respectively.

The default HE-SIG-B may support only one type of content size. Therefore, the receiving end may calculate the time domain length corresponding to 5 MHz, 10 MHz and 20 MHz according to the standard content size during demodulation.

Third Exemplary Embodiment

Figure 13:
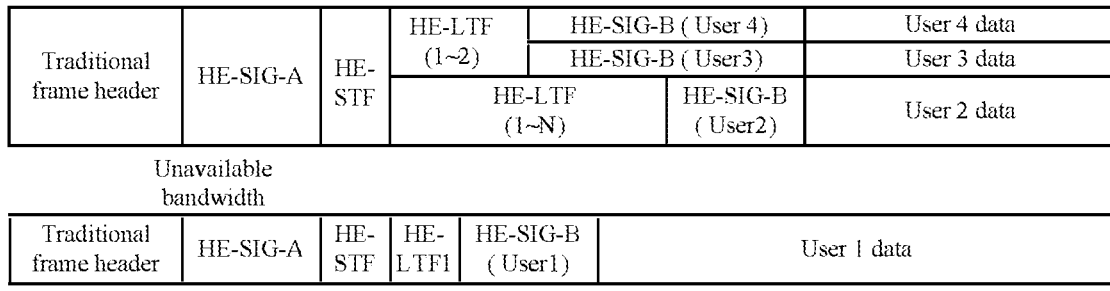
FIG. 13 is a diagram illustrating a sixth basic frame structure according to an exemplary embodiment of the present disclosure.

FIG. 13 is a diagram illustrating a sixth basic frame structure according to an exemplary embodiment of the present disclosure. FIG. 13 shows still another frame structure of the exemplary embodiment of the present disclosure. The difference than the above exemplary embodiment lies in the number of HE-LTFs on different sub-channels may be different and time domain alignment is not needed. Therefore, the time domain start position of the HE-SIG-B on each sub-band is not necessarily the same.

HE-SIG-A may indicate:
a frequency domain available bandwidth, which is the same as the above exemplary embodiment; and
a time domain start position of the HE-SIG-B; each user or each HE-SIG-B sharing each 20 MHz should be indicated separately. The time domain start position may be indirectly indicated by the number of HE-LTFs. For example, on the first 20 MHz sub-channel the number of HE-LTFs is 1, the second 20 MHz sub-channel is unavailable, on the third 20 MHz sub-channel the number of HE-LTFs is N, and on the fourth 20 MHz sub-channel the number of HE-LTFs is 2.

In view of the frame structure 6, a frequency domain width of the HE-SIG-B of four users may be indicated, which, starting from the sub-channel 1, is 20 MHz, 20 MHz, 10 MHz and 10 MHz in turn. Herein, the HE-SIG-A may only indicate width, and does not indicate position or user ID.

In view of the frame structure 6, the frequency domain width of the HE-SIG-B may also be indicated according to three 20 MHz respectively. The HE-SIG-B bandwidth for each group is the same, which, starting from the sub-channel 1, is 20 MHz, 20 MHz and 10 MHz in turn.

The HE-SIG-B may support one type of content size by default. Therefore, the receiving end may calculate the time domain length corresponding to 5 MHz, 10 MHz and 20 MHz according to the standard content size during demodulation.

Fourth Exemplary Embodiment

FIG. 14 is a diagram illustrating a seventh basic frame structure according to an exemplary embodiment of the present disclosure. FIG. 14 shows still another frame structure of the exemplary embodiment of the present disclosure, indicating that the HE-SIG-B area is behind the HE-LTF1 and the HE-SIG-B frequency bandwidth of each user is consistent with the frequency bandwidth of the corresponding data. When there are multiple HE-LTFs, the rest HE-LTFs may be placed behind the HE-SIG-B.

HE-SIG-A may indicate:
a frequency domain available bandwidth, for example, an 8-bit bitmap, which is 10100000;
time domain start positions of the HE-SIG-B area and a separate HE-SIG-B, which may be a default mode regulated in protocols, also may indicate a uniform value, the value being indirectly indicated through the number of HE-LTFs being 1. The information may be respectively indicated, for example, the start position of the HE-SIG-B of each user is indirectly indicated through the number of HE-LTFs being 1, or, each 20 MHz sub-channel is indirectly indicated through the number of HE-LTFs being 1.

The frequency domain width indication method of the HE-SIG-B may be the same as that for the frame structure 6.

The HE-SIG-B may support one type of content size by default. Therefore, the receiving end may calculate the time domain length corresponding to 10 MHz and 20 MHz according to the standard content size during demodulation.

Fifth Exemplary Embodiment

FIG. 15 is a diagram illustrating an eighth basic frame structure according to an exemplary embodiment of the present disclosure. FIG. 15 shows an example that HE-SIG-B areas are aligned in time domain, that is, User 1 may have greater bandwidth relative to Users 2 and 3 in FIG. 15, therefore, the time domain duration of one HE-SIG-B is shorter. In order to align HE-SIG-B areas in time domain, the area behind a normal HE-SIG-B (the dotted box "HE-SIG-B (User 1)" shown in FIG. 15) may need to be filled. The filling solution may adopt a manner of copying the former HE-SIG-B to serve as the filled content as shown in FIG. 15, also may adopt a manner of copying the HE-SIG-B information of other users to serve as the filled content, also may adopt a manner of using a fixed data or random data to serve as the filled content.

HE-SIG-A may indicate:
a frequency domain available bandwidth, for example, an 8-bit bitmap, which is 10100000;
a time domain start position of the HE-SIG-B area, which may be a default mode regulated in protocols, also may indicate a uniform value, the value being indirectly indicated through the number of HE-LTFs being 1; and
a time domain duration length of the HE-SIG-B area, which is twice the time length of two standard HE-SIG-B contents on 20 MHz.

The frequency domain width indication method of the HE-SIG-B may be the same as that for the frame structure 6.

The HE-SIG-B may support one type of content size by default. Therefore, the receiving end may calculate the time domain length corresponding to 10 MHz and 20 MHz according to the standard content size during demodulation.

The receiving end may have redundant information when detecting the HE-SIG-B.

The User 1 may start detection on the sub-channel 1 and stop detection when detecting its own HE-SIG-B, and may start again receiving the data part indicated by its own HE-SIG-B after the end of the HE-SIG-B area time. If the number of HE-LTFs is greater than 1, the User 1 may need to receive the rest HE-LTF after the end of the HE-SIG-B area.

The User 2 may start detection on the sub-channel 1 and may detect the HE-SIG-B of the User 1 that does not belong to the User 2 after the standard HE-SIG-B time length of 20 MHz bandwidth, then may detect that the sub-channel 2 is unavailable and next may continue decoding the sub-channel 3. However, on the sub-channel 3, the HE-SIG-B may be of 10 MHz width, the content may be of standard length, therefore, the User 2 may need to wait some time before decoding a complete packet. If there are more sub-channels being HE-SIG of 20 MHz bandwidth at this time, the User 2 may continue decoding until the sub-channel intersection supported by both the User 2 and the AP is decoded completely. After waiting the duration of the HE-SIG-B area, the HE-SIG-Bs of all user specific scheduling information may be decoded completely, so that the User 2 can determine whether there is scheduling for the User 2 itself currently.

Sixth Exemplary Embodiment

FIG. 16 is a diagram illustrating a ninth basic frame structure according to an exemplary embodiment of the present disclosure. FIG. 16 shows an example that HE-SIG-B areas are aligned in time domain. In this exemplary embodiment, the HE-SIG-B of each user may occupy the same time frequency resource, the bandwidth corresponding to the data may be different. For example, the data of Users 2 and 3 may occupy the bandwidth of half sub-channel. However, their HE-SIG-B information may still occupy the bandwidth of the entire sub-channel. Since the HE-SIG-B of the three users cannot occupy the entire area, the rest position may need to be filled, like the above example.

HE-SIG-A may indicate:
- a frequency domain available bandwidth, for example, an 8-bit bitmap, which is 10100000;
- a time domain start position of the HE-SIG-B area, which may be a default mode regulated in protocols, also may indicate a uniform value, the value being indirectly indicated through the number of HE-LTFs being 1;
- a time domain duration length of the HE-SIG-B area, which is twice the time length of two standard HE-SIG-B contents on 20 MHz; and
- a frequency domain width default value of the HE-SIG-B, which is 20 MHz.

The HE-SIG-B may support one type of content size by default. Therefore, the receiving end may calculate the time domain length corresponding to 10 MHz and 20 MHz according to the standard content size during demodulation.

The receiving end may have redundant information when detecting the HE-SIG-B.

The User 1 may start detection on the sub-channel 1 and stop detection when detecting its own HE-SIG-B, and may start again receiving the data part indicated by its own HE-SIG-B after the end of the HE-SIG-B area time. If the number of HE-LTFs is greater than 1, the User 1 may need to receive the rest HE-LTF after the end of the HE-SIG-B area.

The User 2 may start detection on the sub-channel 1 and may detect the HE-SIG-B of the User 1 that does not belong to the User 2 after the standard HE-SIG-B time length of 20 MHz bandwidth, then may detect that the sub-channel 2 is unavailable and next may continue decoding the sub-channel 3 until the sub-channel intersection supported by both the User 2 and the AP is decoded completely. After waiting the duration of the HE-SIG-B area, the HE-SIG-Bs of all user specific scheduling information may be decoded completely, so that the User 2 can determine whether there is scheduling for the User 2 itself currently.

Seventh Exemplary Embodiment

FIG. 17 is a diagram illustrating a tenth basic frame structure according to an exemplary embodiment of the present disclosure. FIG. 17 shows another example that HE-SIG-B areas are aligned in time domain. In this exemplary embodiment, the HE-SIG-B of each user may occupy different time-frequency resources. The reason for occupying different time-frequency resources may lie in the difference in content size, for example, different numbers of spatial streams are supported. In a condition that contents are consistent, the reason for occupying different time-frequency resources may lie in difference in the code modulation methods and rates. For example, in FIG. 17, resources occupied by the HE-SIG-B of User 3 and User 4 are twice the resources occupied by the HE-SIG-B of User 1 and User 2.

HE-SIG-A may indicate:
- a frequency domain available bandwidth, for example, an 8-bit bitmap, which is 10100000;
- a time domain start position of the HE-SIG-B area, which may be a default mode regulated in protocols, also may indicate a uniform value, the value being indirectly indicated through the number of HE-LTFs being 1;
- a time domain duration length of the HE-SIG-B area, which is twice the time length of two standard HE-SIG-B contents on 20 MHz; and
- a frequency domain width default value of the HE-SIG-B, which is 20 MHz.

The HE-SIG-B may support multiple types of content sizes by default. For example, the sub-channel 2 may support a standard content size, the sub-channel 1 may support one type greater than the standard content, and the sub-channel 3 may support one type smaller than the standard content.

Therefore, the receiving end may calculate the time domain length corresponding to 10 MHz and 20 MHz according to the standard content size during demodulation.

The receiving end may have redundant information when detecting the HE-SIG-B.

The public scheduling indicator information may also carry a group number to support user group scheduling, indicating that users currently scheduled all belong to the group. A grouping method may be: first determining the number of groups, then putting the users whose AIDs modulo the number of groups are the same into one group. Another grouping method may be: putting the users, having predefined user IDs which begin with the same digits, into one group.

After the receiving end receives the scheduling information, if the receiving end determines that the receiving end itself belongs to the group, the receiving end may continue decoding, otherwise, the receiving end may choose to continue receiving or to sleep till the end point of the frame.

Eighth Exemplary Embodiment

For all the above exemplary embodiments, the second type of scheduling information HE-SIG-B probably does not exist according to specific application requirements, and this frame may be formed, transmitted and received according to the scheduling information outside this frame.

To sum up, through the method for transmitting scheduling information provided in some embodiments of the present disclosure, flexible transmission of scheduling information on multiple bandwidth granularities may be supported, and resource sharing between scheduling information and data may be supported to some extent, thus the resource utilization is high.

In another exemplary embodiment, software is provided, which may be configured to execute the solution in the above exemplary embodiments and exemplary implementations.

In another exemplary embodiment, a storage medium is provided, which may store the above software, the storage medium including but not limited: compact disc, floppy disk, hard disk, erasable memory, etc.

Obviously, those skilled in the art should understand that the modules or acts described above may be implemented by a common computer device. The modules or acts may be integrated on a single computing device or distributed on a network composed of a plurality of computing devices. In an exemplary embodiment, the modules or acts may be implemented by a programming code executable by a computing device, thus they may be stored in a storage device to be executed by a computing device and executed in a different order in some cases, or manufactured into individual integrated circuit module respectively, or several of them may be manufactured into a single integrated circuit module to implement. In this way, the present disclosure is not limited to any combination of specific hardware and software.

The above are only the exemplary embodiments of the present disclosure and not intended to limit the present disclosure. For those skilled in the art, various modifications and changes may be made to the present disclosure. Any modification, equivalent substitution and improvement made within the principle of the present disclosure are intended to be included within the scope of protection defined by the appended claims of the present disclosure.

INDUSTRIAL APPLICABILITY

The present disclosure relates to the field of communications, and provides a method and a device for transmitting or receiving scheduling information. In the method for transmitting scheduling information, information about a scheduling result of resources to be occupied by one or more UEs may be acquired; and scheduling information including a first type of scheduling information and a second type of scheduling information may be transmitted to the one or more UEs according to the information about the scheduling result. The first type of scheduling information may include information for parsing the second type of scheduling information, and the scheduling information may determine a resource scheduling condition of the user. The solution in some exemplary embodiments of the present disclosure may solve a problem of how public information indicates a receiving end to parse the user specific information, and may realize an effect that the public information indicates the receiving end to parse the user specific information.

What is claimed is:

1. A method for transmitting scheduling information for a wireless local area network (WLAN), comprising:
    acquiring, by one or more computer processors, resource scheduling information related to scheduling of resources associated with one or more User Equipment (UEs); and
    transmitting, by the one or more computer processors, according to the resource scheduling information, a radio frame comprising a first type of scheduling information and a second type of scheduling information to the one or more UEs such that the first type of scheduling information comprises a first frequency domain resource indicator information applicable for parsing the second type of scheduling information representing user specific scheduling information of the one or more UEs,
    wherein the first frequency domain resource indicator information included in the first type of scheduling information indicates whether an entire bandwidth area for the user specific information is discontinuous due to one or more partial unavailable bandwidths located between and separating partial available bandwidths within the entire bandwidth area,
    wherein the entire bandwidth area is discontinuous and the radio frame is configured to include an instance of the first type of scheduling information in each of the partial available bandwidths that are separated by the one or more partial unavailable bandwidths.

2. The method as claimed in claim 1, wherein the first frequency domain resource indicator information includes a representation of whether a specified bandwidth position on a total bandwidth of the entire bandwidth area is scheduled for the user specific scheduling information.

3. The method as claimed in claim 1, wherein the first type of scheduling information comprises one or more second frequency domain resource indicator information pieces, wherein the second frequency domain resource indicator information pieces are used to indicate that all the second type of scheduling information pieces occupy a same bandwidth value or different bandwidth values.

4. The method as claimed in claim 1, wherein the first type of scheduling information further comprises at least one of the following information:
    first time domain resource indicator information of the user specific scheduling information area, or
    second time domain resource indicator information of each piece of the second type of scheduling information;
    wherein the first time domain resource indicator information is used to indicate a first start time and/or a first time domain duration of the user specific scheduling information area, and the second time domain resource indicator information is used to indicate a second start time and/or a second time domain duration of each piece of the second type of scheduling information.

5. The method as claimed in claim 4, wherein the first start time or the second start time is configured in accordance with at least one of the following:
    when the first start time or the second start time is used to indicate that adoption of a predefined time is supported, then configuration of the first start time or the second start time is optional;
    when the first start time or the second start time is used to indicate that sharing of one start time among different frequency bands is supported, then the first start time or the second start time is configured uniformly; and
    when the first start time or the second start time is used to indicate that adoption of different start times for different frequency bands is supported, then the first start time or the second start time is configured separately.

6. The method as claimed in claim 4, wherein the first time domain duration or the second time domain duration is configured in accordance with at least one of the following:
    when the first time domain duration or the second time domain duration supports adoption of a predefined time length for the user specific scheduling information area and/or each piece of the second type of scheduling information, then configuration of the first time domain duration or the second time domain duration is optional;
    in case the second time domain duration supports a fixed content length for the user specific scheduling information, and a frequency domain width of the second type of scheduling information is predefined, a time domain duration of each piece of the second type of scheduling information is calculated and configuration of the second time domain duration is optional; and
    in case a content length of the second type of scheduling information is predefined and a frequency domain width of the second type of scheduling information is predefined, a time domain duration of each piece of the second type of scheduling information is calculated and configuration of the second time domain duration is optional.

7. The method as claimed in claim 1, wherein the first type of scheduling information further comprises a group number, wherein the group number is used to indicate a group to which the one or more UEs that are currently scheduled belong, wherein grouping of the one or more UEs is implemented in accordance with at least one of:

determining a remainder after dividing an Association Identifier (AID) of each UE by the number of groups, and putting one or more UEs with the same remainders into the same group; or putting one or more UEs whose predefined UE IDs begin with the same digits, the number of the digits being a predetermined number, into the same group.

8. A method for receiving scheduling information for a wireless local area network (WLAN), comprising:

receiving, by a User Equipment (UE), a radio frame comprising a first type of scheduling information and a second type of scheduling information related to scheduling of resources associated with one or more UEs, such that the first type of scheduling information comprises a first frequency domain resource indicator information applicable for parsing the second type of scheduling information representing user specific scheduling information of one or more UEs including the UE, wherein the first frequency domain resource indicator information included in the first type of scheduling information indicates whether an entire bandwidth area for the user specific information is discontinuous due to one or more partial unavailable bandwidths located between and separating partial available bandwidths within the entire bandwidth area, wherein the entire bandwidth area is discontinuous and the radio frame is configured to include an instance of the first type of scheduling information in each of the partial available bandwidths that are separated by the one or more partial unavailable bandwidths.

9. The method as claimed in claim 8, wherein the first frequency domain resource indicator information includes a representation of whether a specified bandwidth position on a total bandwidth of the entire bandwidth area is scheduled for the user specific scheduling information.

10. The method as claimed in claim 8, wherein the first type of scheduling information comprises one or more second frequency domain resource indicator information pieces, wherein the second frequency domain resource indicator information pieces are used to indicate that all the second type of scheduling information pieces occupy a same bandwidth value or different bandwidth values.

11. The method as claimed in claim 8, wherein the first type of scheduling information further comprises at least one of the following information:

first time domain resource indicator information of the user specific scheduling information area, or second time domain resource indicator information of each piece of the second type of scheduling information;

wherein the first time domain resource indicator information is used to indicate a first start time and/or a first time domain duration of the user specific scheduling information area, and the second time domain resource indicator information is used to indicate a second start time and/or a second time domain duration of each piece of the second type of scheduling information.

12. The method as claimed in claim 11, wherein the first start time or the second start time is configured in accordance with at least one of the following:

when the first start time or the second start time is used to indicate that adoption of a predefined time is supported, then configuration of the first start time or the second start time is optional;

when the first start time or the second start time is used to indicate that sharing of one start time among different frequency bands is supported, then the first start time or the second start time is configured uniformly; and when the first start time or the second start time is used to indicate that adoption of different start times for different frequency bands is supported, then the first start time or the second start time is configured separately.

13. The method as claimed in claim 11, wherein the first time domain duration or the second time domain duration is configured in accordance with at least one of the following:

when the first time domain duration or the second time domain duration supports adoption of a predefined time length for the user specific scheduling information area and/or each piece of the second type of scheduling information, then configuration of the first time domain duration or the second time domain duration is optional;

in case the second time domain duration supports a fixed content length for the user specific scheduling information, and a frequency domain width of the second type of scheduling information is predefined, a time domain duration of each piece of the second type of scheduling information is calculated and configuration of the second time domain duration is optional; and in case a content length of the second type of scheduling information is predefined and a frequency domain width of the second type of scheduling information is predefined, a time domain duration of each piece of the second type of scheduling information is calculated and configuration of the second time domain duration is optional.

14. The method as claimed in claim 8, wherein the first type of scheduling information further comprises a group number, wherein the group number is used to indicate a group to which the one or more UEs that are currently scheduled belong, wherein grouping of the one or more UEs is implemented in accordance with at least one of:

determining a remainder after dividing an Association Identifier (AID) of each UE by the number of groups, and putting one or more UEs with the same remainders into the same group; or putting one or more UEs whose predefined UE IDs begin with the same digits, the number of the digits being a predetermined number, into the same group.

15. A device for transmitting scheduling information, comprising at least one hardware processor and memory comprising instructions configured to:

acquire resource scheduling information related to scheduling of resources associated with one or more User Equipment (UEs) for a wireless local area network (WLAN); and transmit, according to the resource scheduling information, a radio frame comprising a first type of scheduling information and a second type of scheduling information to the one or more UEs, such that the first type of scheduling information comprises a first frequency domain resource indicator information applicable for parsing the second type of scheduling information representing user specific scheduling information of the one or more UEs, wherein the first frequency domain resource indicator information included in the first type of scheduling information indicates whether an entire bandwidth area for the user specific information is discontinuous due to one or more partial unavailable bandwidths located between and separating partial available bandwidths within the entire bandwidth area, wherein the entire bandwidth area is discontinuous and the radio frame is configured to include an instance of the first type of scheduling information in each of the partial available bandwidths that are separated by the one or more partial unavailable bandwidths.

16. The device as claimed in claim 15, wherein the first frequency domain resource indicator information includes a representation of whether a specified bandwidth position on a total bandwidth of the entire bandwidth area is scheduled for the user specific scheduling information.

17. The device as claimed in claim 15, wherein the first type of scheduling information comprises one or more second frequency domain resource indicator information pieces, wherein the second frequency domain resource indicator information pieces are used to indicate that all the second type of scheduling information pieces occupy a same bandwidth value or different bandwidth values.

18. The device as claimed in claim 15, wherein the first type of scheduling information further comprises at least one of the following information:
   first time domain resource indicator information of the user specific scheduling information area, or
   second time domain resource indicator information of each piece of the second type of scheduling information;
   wherein the first time domain resource indicator information is used to indicate a first start time and/or a first time domain duration of the user specific scheduling information area, and the second time domain resource indicator information is used to indicate a second start time and/or a second time domain duration of each piece of the second type of scheduling information.

19. The device as claimed in claim 18, wherein the first start time or the second start time is configured in accordance with at least one of the following:
   when the first start time or the second start time is used to indicate that adoption of a predefined time is supported, then configuration of the first start time or the second start time is optional;
   when the first start time or the second start time is used to indicate that sharing of one start time among different frequency bands is supported, then the first start time or the second start time is configured uniformly; and
   when the first start time or the second start time is used to indicate that adoption of different start times for different frequency bands is supported, then the first start time or the second start time is configured separately.

20. The device as claimed in claim 18, wherein the first time domain duration or the second time domain duration is configured in accordance with at least one of the following:
   when the first time domain duration or the second time domain duration supports adoption of a predefined time length for the user specific scheduling information area and/or each piece of the second type of scheduling information, then configuration of the first time domain duration or the second time domain duration is optional;
   in case the second time domain duration supports a fixed content length for the user specific scheduling information, and a frequency domain width of the second type of scheduling information is predefined, a time domain duration of each piece of the second type of scheduling information is calculated and configuration of the second time domain duration is optional; and
   in case a content length of the second type of scheduling information is predefined and a frequency domain width of the second type of scheduling information is predefined, a time domain duration of each piece of the second type of scheduling information is calculated and configuration of the second time domain duration is optional.

* * * * *